United States Patent
Langhammer

(10) Patent No.: US 10,678,510 B2
(45) Date of Patent: Jun. 9, 2020

(54) DENORMALIZATION IN MULTI-PRECISION FLOATING-POINT ARITHMETIC CIRCUITRY

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 16/333,970

(22) PCT Filed: Sep. 25, 2017

(86) PCT No.: PCT/US2017/053174
§ 371 (c)(1),
(2) Date: Mar. 15, 2019

(87) PCT Pub. No.: WO2018/080685
PCT Pub. Date: May 3, 2018

(65) Prior Publication Data
US 2019/0250886 A1 Aug. 15, 2019

Related U.S. Application Data

(63) Continuation of application No. 15/619,733, filed on Jun. 12, 2017, now abandoned.
(Continued)

(51) Int. Cl.
*G06F 7/57* (2006.01)
*G06F 7/483* (2006.01)
(Continued)

(52) U.S. Cl.
CPC ............... *G06F 7/57* (2013.01); *G06F 7/483* (2013.01); *G06F 7/4876* (2013.01);
(Continued)

(58) Field of Classification Search
CPC ......................... G06F 7/4876; G06F 7/49915
See application file for complete search history.

(56) References Cited

U.S. PATENT DOCUMENTS 7,346,643 B1 * 3/2008 Ho ........................ G06F 7/483
708/501
8,671,129 B2 3/2014 Brooks et al.
(Continued)

FOREIGN PATENT DOCUMENTS

KR 10-2012-0053343 A 5/2012
WO 2016-003740 A1 1/2016

*Primary Examiner* — Chuong D Ngo
(74) *Attorney, Agent, or Firm* — Treyz Law Group, P.C.; Jason Tsai

(57) ABSTRACT

The present embodiments relate to integrated circuits with floating-point arithmetic circuitry that handles normalized and denormalized floating-point numbers. The floating-point arithmetic circuitry may include a normalization circuit and a rounding circuit, and the floating-point arithmetic circuitry may generate a first result in form of a normalized, unrounded floating-point number and a second result in form of a normalized, rounded floating-point number. If desired, the floating-point arithmetic circuitry may be implemented in specialized processing blocks.

24 Claims, 9 Drawing Sheets

Related U.S. Application Data

(60) Provisional application No. 62/413,780, filed on Oct. 27, 2016.

(51) Int. Cl.
    *G06F 7/487*     (2006.01)
    *G06F 7/499*     (2006.01)
    *G06F 7/544*     (2006.01)

(52) U.S. Cl.
    CPC ...... *G06F 7/49915* (2013.01); *G06F 7/49936* (2013.01); *G06F 7/5443* (2013.01)

(56) References Cited

U.S. PATENT DOCUMENTS

| | | |
|---|---|---|
| 9,098,332 B1 | 8/2015 | Langhammer |
| 2008/0183791 A1 | 7/2008 | Ying-Wai et al. |
| 2008/0215660 A1 | 9/2008 | Fukumura et al. |
| 2010/0042665 A1* | 2/2010 | Ahmed .................. G06F 7/485 708/209 |
| 2011/0106868 A1 | 5/2011 | Lutz |
| 2012/0124117 A1* | 5/2012 | Yu .......................... G06F 7/483 708/205 |
| 2016/0291934 A1 | 10/2016 | Czajkowski |
| 2017/0060533 A1* | 3/2017 | Ahmed .................. G06F 7/483 |

* cited by examiner

DENORMALIZATION IN MULTI-PRECISION FLOATING-POINT ARITHMETIC CIRCUITRY

CROSS REFERENCE TO RELATED APPLICATION

This application claims priority to U.S. patent application Ser. No. 15/619,733, filed Jun. 12, 2017, and provisional patent application No. 62/413,780, filed on Oct. 27, 2016, which are hereby incorporated by reference herein their entireties.

TECHNICAL FIELD

The present embodiments relate to integrated circuits and, more particularly, to denormalization in multi-precision floating-point arithmetic circuitry in an integrated circuit.

BACKGROUND

As applications increase in complexity, it has become more common to include specialized arithmetic circuitry that is sometimes arranged in specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, adders, accumulators, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits and register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits often include specialized processing blocks. Each of those specialized processing blocks includes multipliers, adders, and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, they would be constructed outside the specialized processing block using general-purpose programmable logic of the device, or using a combination of the fixed-point operators inside the specialized processing block with additional logic in the general-purpose programmable logic.

DETAILED DESCRIPTION

Figure 1:
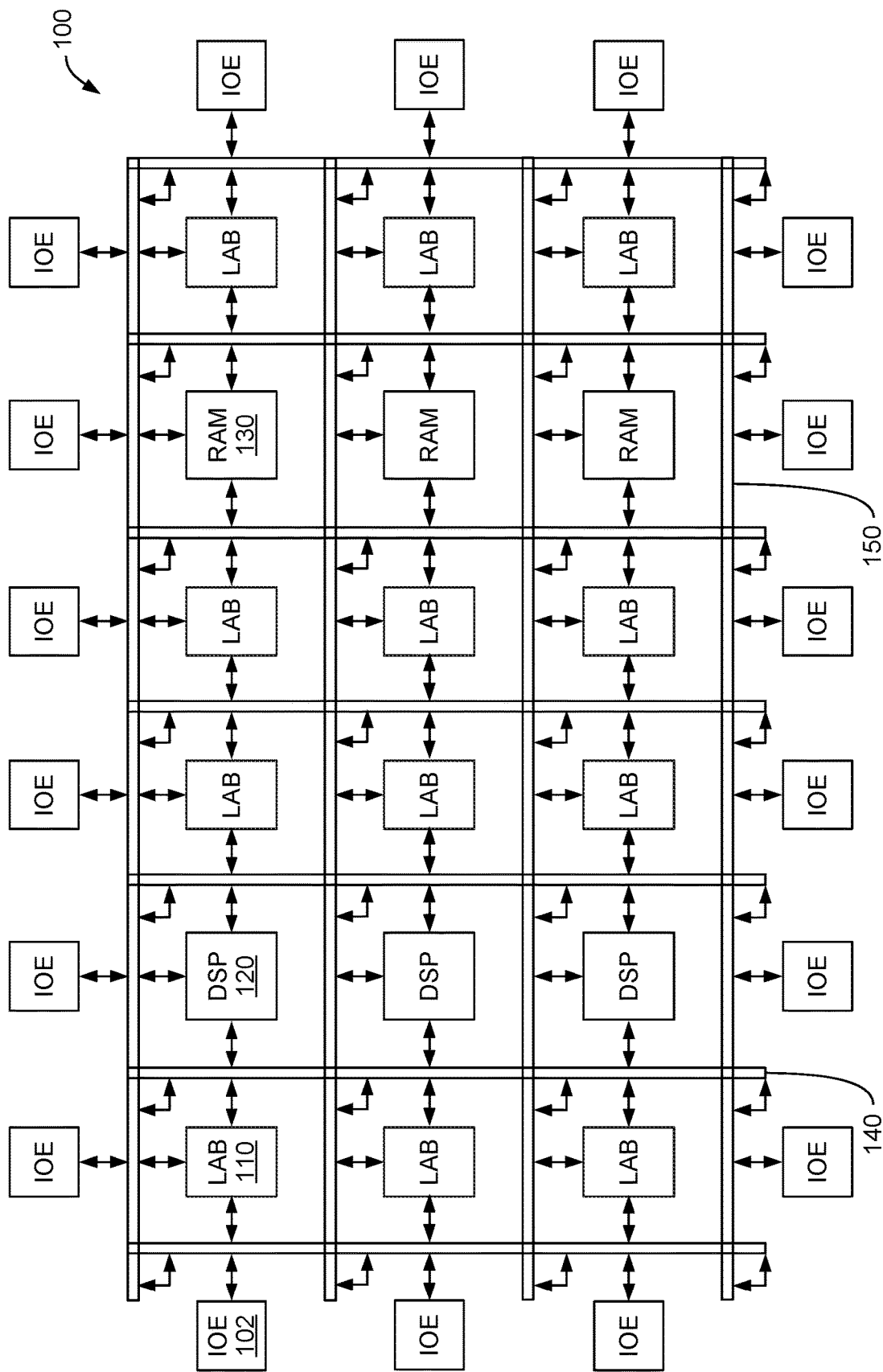
FIG. 1 shows a diagram of an illustrative integrated circuit such as a programmable integrated circuit in accordance with some embodiments.

The present embodiments provided herein relate to integrated circuits and, more particularly, to denormalization in multi-precision floating-point arithmetic circuitry in an integrated circuit.

Floating-point numbers are commonplace for representing real numbers in scientific notation in computing systems and are designed to cover a large numeric range and diverse precision requirements. The IEEE 754 standard, ANSI/IEEE Std. 754-2008, published Aug. 29, 2008, is commonly used for floating-point numbers. A floating-point number includes three different parts: a sign, a mantissa sometimes also referred to as a significant, and an exponent. Each of these parts may be represented by a binary number and, in the format of the IEEE 754 standard, have different bit sizes depending on the precision. For example, a single-precision floating-point number may require 32 bits, which are distributed as follows: one sign bit (bit 31), eight exponent bits (bits [30:23]), and 23 mantissa bits (bits [22:0]). A double-precision floating-point number may require 64 bits including one sign bit (bit 63), 11 exponent bits (bits [62:52]), and 52 mantissa bits (bits [51:0]). A half-precision floating-point number may require 16 bits including one sign bit (bit 15), 5 exponent bits (bits [14:10]), and 10 mantissa bits (bits [9:0]).

According to the IEEE 754 standard, a mantissa may also have additional bits. A mantissa that has additional bits is sometimes also referred to as an extended mantissa.

In some embodiments, a mantissa may have three bits added to the right of the least significant bit (LSB) for round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

Two bits may be added beyond the most significant bit (MSB) position, if desired, and may absorb any overflow produced by a floating-point arithmetic operation.

The sign of a floating-point number according to the IEEE 754 standard is represented using a single bit, where a zero denotes a positive number and a one denotes a negative number.

The exponent of a floating-point number preferably is an unsigned binary number which, for the single-precision format, ranges from 0 to 255. In order to represent a very small number, it is necessary to use negative exponents. Thus, the exponent preferably has a negative bias. For single-precision floating-point numbers, the bias preferably is −127. For example, a value of 140 for the exponent actually represents (140−127)=13, and a value of 100 represents (100−127)=−27. For double-precision and half-precision floating-point numbers, the exponent bias preferably is −1023 and −15, respectively.

Thus, a binary floating-point number of a given precision with the absolute value of the bias 'abs(bias)' having the value 'sign' in the sign field, the value 'exponent' in the exponent field, and the value 'mantissa' in the mantissa field represents the number $$(-1)^{'sign'} \times (1 \cdot 'mantissa') \times 2^{('exponent'-'abs(bias)')} \quad (1)$$

As discussed above, according to the IEEE 754 standard, the mantissa is a normalized number (i.e., it has no leading zeros and represents the precision component of a floating-point number as shown in equation (1)). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

The IEEE 754 standard also defines special cases. For example, a zero exponent with a zero mantissa represents '0', an all '1' exponent with a zero mantissa represents infinity, an all '1' exponent with a non-zero mantissa represents not-a-number (NaN), and a zero exponent with a non-zero mantissa represents a subnormal number.

A subnormal number, also known as a denormal number or a denormalized number, or as a gradual underflow, is a number that is smaller than the smallest number that can be represented using a legal exponent and a normalized mantissa. If a number is not assumed to be normalized, and a leading '1' is not implied, then for each '0' in the more significant bit positions in the mantissa, the effective exponent is decreased by 1.

For example, $0.111 \times 2^{-126} = 1.11 \times 2^{-127}$, while $0.00001 \times 2^{-126} = 1 \times 2^{-131}$. Thus, in single-precision floating-point with a 24-bit mantissa (including the implied position), one can have 23 leading zeros without a complete loss of precision, meaning that the smallest single-precision subnormal number that can be represented under the IEEE 754 standard is $1.0 \times 2^{(-126-23)} = 1.0 \times 2^{-149}$. Similarly, in half-precision floating-point with an 11-bit mantissa (including the implied position), one can have 10 leading zeros without a complete loss of precision, meaning that the smallest half-precision subnormal number that can be represented under the IEEE 754 standard is $1.0 \times 2^{(-14-10)} = 1.0 \times 2^{-24}$.

Taking a complete half-precision floating-point number according to the IEEE 754 standard as an example, if the number (in binary) is represented as 0000000000001011, then the sign bit is '0', the exponent is '00000', and the mantissa is '0000001011'. Normally, the smallest legal exponent value is '00001' (i.e., −14 with a bias of −15). As mentioned above, a '00000' exponent identifies a denormalized number. Note, however that the IEEE 754 standard maps a zero exponent to −14 in half-precision floating-point and to −126 in single-precision floating-point. Thus, in the example above, the number 0000000000001011 is $(+1) \times 0.0000001011 \times 2^{-14} = 1.011 \times 2^{-21}$.

There are several ways that an arithmetic operation such as a multiplication operation and/or an addition operation generate results that fall outside the range of a normalized floating-point precision. For example, a multiplication operation of two half-precision floating-point numbers may generate a product that is greater than the biggest number that is representable in half-precision floating-point format, thereby generating infinity as a result during normalization operations. As another example, a multiplication of two single-precision floating-point numbers may generate a product that is smaller than the smallest number that is representable in single-precision floating-point format, especially if at least one of the two single-precision floating-point numbers is a denormalized number. Such a denormalized number may be set to zero during normalization operations.

Both examples of generating results that fall outside the range of a normalized floating-point precision lead to a loss of accuracy, the probability of which increases for smaller floating-point precisions. In other words, half-precision floating-point arithmetic circuitry is more likely to encounter numbers that fall outside of the half-precision floating-point range than single-precision floating-point arithmetic circuitry. It may therefore be desirable to support denormalized floating-point numbers that fall outside the range of a normalized floating-point precision.

However, arithmetic circuitry that supports denormalized numbers is often expensive to implement in an integrated circuit. Additional logic circuitry is usually required for shifting the mantissa into the denormalized position and for processing the denormalized numbers in exception handling and exponent generation circuitry. The problem is especially acute for multipliers, as there is no circuitry that can be re-used or functionally combined.

Consequently, it is desirable to provide an integrated circuit that efficiently handles floating-point numbers and results of arithmetic operations on floating-point numbers that fall outside the range of a normalized floating-point precision.

For example, a multiplication of two normalized floating-point numbers may generate a product that is greater than the normal floating-point range. Similarly, a multiplication of two normalized floating-point numbers, a multiplication of a normalized floating-point number and a denormalized floating-point number, or a multiplication of two denormalized floating-point numbers may generate a product that is smaller than the normal floating-point range.

As a first example, consider the scenario in which $1.0 \times 2^{15}$ is multiplied by $1.0 \times 2^{15}$ using half-precision floating-point arithmetic circuitry. In half-precision floating-point format, both numbers have a representation of '0111100000000000' (i.e., sign='0', exponent='11110', and mantissa='0000000000'). In this scenario, the product would be 1.0×2³⁰, which is greater than the greatest number representable in half-precision floating-point format. In fact, in half-precision floating-point format, the result would be output as infinity (i.e., as '0111110000000000') after normalization, thereby leading to a loss of information.

As a second example, consider the scenario in which 1.0×2⁻¹⁴ is multiplied by 1.0×2⁻¹⁴ using half-precision floating-point arithmetic circuitry. In half-precision floating-point format, both numbers have a representation of '0000010000000000' (i.e., sign='0', exponent='00001', and mantissa='0000000000') and are the smallest positive normalized numbers that can be represented in the half-precision floating-point format. In this scenario, the product would be 1.0×2⁻²⁸, which is smaller than the smallest number representable in half-precision floating-point format. In fact, in half-precision floating-point format, the result would be output as zero (i.e., as '0000000000000000') after normalization, thereby leading to a loss of information.

In some embodiments, the exponent range may be increased, enabling the handling of normalized mantissas with a higher precision. In other words, the exponent may be represented using one or more additional bits. The ability to represent the exponent with one or more additional bits is sometimes also referred to as having an extended exponent, an extended exponent range, or a dynamic exponent range. This extended exponent range may be adjusted dynamically (i.e., when needed) or permanently, if desired.

For example, in half-precision floating-point, a sixth exponent bit may be introduced and the absolute value of the bias may be increased, for example by adding a '1' to the least-significant bit (LSB) of the bias. Thus, the bias would decrease from −15 to −31. Hence, the product of the first example, 1.0×2³⁰, would be represented as '01111010000000000' (i.e., sign='0', exponent='111101', and mantissa='0000000000'), and the product of the second example, 1.0×2⁻²⁸, would be represented as '00000110000000000' (i.e., sign='0', exponent='000011', and mantissa='0000000000').

An extended exponent having one extra exponent bit may suffice to prevent a loss of precision in the mantissa caused by an overflow or an underflow in case of a multiplication of two normalized floating-point numbers. Whether the one extra exponent bit is sufficient also depends on the choice of the new bias.

If desired, the new bias may be chosen arbitrarily. Choosing the absolute value of a new bias as close as possible to half of the greatest number that can be represented with the extended exponent may ensure that the one extra exponent bit is sufficient to prevent a loss of information in the mantissa. In the example in which the extended exponent has six bits, the greatest exponent number that a normalized number can have is '111110' (i.e., 62 in decimal number format, '111111' which is 63 in decimal number format would indicate either infinity or NaN). As shown above, a new bias of −31 ensures that an extended exponent with one additional exponent bit is sufficient to prevent a loss of information from both, underflow and overflow, in the mantissa during the multiplication of two normalized half-precision floating-point numbers.

However, choosing a new bias smaller than −33 (i.e., −34, −35, etc.) may lead to a loss of precision during normalization in the first example, while choosing a new bias greater than −28 (i.e., −27, −26, etc.) may lead to a loss of precision during normalization in the second example.

If desired, the absolute value of the new bias may be chosen differently. For example, an application that is concerned with a loss of information due to underflow may preferably have an absolute value of the new bias that is greater than half of the greatest number that can be represented with the extended exponent, while an application that is concerned with a loss of information due to overflow may preferably have an absolute value of new bias that is smaller than half of the greatest number that can be represented with the extended exponent.

As another example, consider the scenario in which 1.0×2⁻²⁴ is multiplied by 1.0×2⁻²⁴. As mentioned above, both numbers are the smallest positive denormalized numbers that can be represented in the half-precision floating-point format as '0000000000000001' (i.e., sign='0', exponent='00000', and mantissa='0000000001'). In this scenario, the product would be 1.0×2⁻⁴⁸, which is smaller than what is representable in half-precision floating-point format. In fact, in half-precision floating-point format, the result would be output as zero (i.e., as '0000000000000000') after normalization, thereby leading to a loss of information.

In some embodiments, the output exponent range may be increased by two bits. A sixth and seventh exponent bit may be introduced and the absolute value of the bias may be increased, for example by adding two '1' to the least-significant bit (LSB) of the bias. Thus, the bias would decrease from −15 to −63. Hence, the product of the example, 1.0×2⁻⁴⁸, would be represented as '000011110000000000' (i.e., sign='0', exponent='0001111', and mantissa='0000000000').

Thus, an extended exponent having one extra exponent bit may suffice to prevent a loss of precision in the mantissa caused by an underflow or overflow in case of a multiplication of two normalized floating-point numbers, depending on the new bias.

However, the number of extra exponent bits that are required to prevent a loss of precision in the mantissa caused by an underflow in case of a multiplication of two denormalized floating-point numbers may also depends on the number of mantissa bits.

Consider the scenario in which 'exp_width' refers to the number of exponent bits of a given precision, 'add_bits' refers to the number of extra exponent bits in addition to the exponent bits, 'abs(new_bias)' refers to the absolute value of a new bias that a number with the extra exponent bits may have, 'abs(bias)' refers to the absolute value of the bias of the given precision, and 'mantissa_width' to the number of mantissa bits. In this scenario, the greatest exponent representable in the given precision is $$2^{exp\_width}-2-abs(bias) \qquad (2)$$

and the smallest exponent representable in the given precision in form of a denormalized number is $$1-abs(bias)-mantissa\_width \qquad (3)$$

Thus, the biggest exponent resulting from a multiplication of two normalized floating-point numbers of the given precision is $$2^{(exp\_width+1)}-3-2*abs(bias) \qquad (4)$$

and the smallest exponent resulting from a multiplication of two denormalized floating-point numbers of the given precision is $$2*(1-abs(bias)-mantissa\_width) \qquad (5)$$

Similar to the expressions in (2) and (3), the greatest and smallest exponent of a normalized number that is representable with the extended exponent and new bias are respectively $$2^{(exp\_width+add\_bits)}-2-\text{abs}(\text{new\_bias}) \quad (6)$$

and $$1-\text{abs}(\text{new\_bias}) \quad (7)$$

Thus, 'add bits' and 'new bias' may be chosen such that the expression in (6) is greater than or equal to the expression in (4) to guarantee that a normalized number with an extended exponent can represent the biggest exponent resulting from a multiplication of two normalized floating-point numbers of the given precision without loss of information. This leads to the inequality $$2^{(exp\_width+add\_bits)}-2-\text{abs}(\text{new\_bias}) \geq 2^{(exp\_width+1)}-3-2*\text{abs}(\text{bias}) \quad (8)$$

Similarly, 'add_bits' and 'new_bias' may be chosen such that the expression in (7) is smaller than or equal to the expression in (5) to guarantee that a normalized number with an extended exponent can represent the smallest exponent resulting from a multiplication of two denormalized floating-point numbers of the given precision without loss of information. This leads to the inequality $$1-\text{abs}(\text{new\_bias}) \leq 2*(1-\text{abs}(\text{bias})-\text{mantissa\_width}) \quad (9)$$

As an example, consider the scenario in which 'new_bias' is derived from 'bias' by inserting 'add_bits' ones at the LSB position of 'bias'. Thus, the absolute value of 'new_bias' may be expressed as $$\text{abs}(\text{new\_bias})=2^{add\_bits}(\text{abs}(\text{bias})+1)-1 \quad (10)$$

In this scenario, combining equation (10) with inequality (8) and simplifying leads to $$2^{(exp\_width+add\_bits)}+2-2^{add\_bits}(\text{abs}(\text{bias})+1) \geq 2^{(exp\_width+1)}-2*\text{abs}(\text{bias}) \quad (11)$$

and combining equation (10) with inequality (9) and simplifying leads to $$(2^{add\_bits}-2)\text{abs}(\text{bias})+2^{add\_bits} \geq 2*\text{mantissa\_width} \quad (12)$$

In half-precision, single-precision, and double-precision floating-point, 'exp_width' is 5, 8, and 11, respectively, 'abs_bias' is −15, −127, and −1023, respectively, and 'mantissa_width' is 10, 23, and 52, respectively. It can be easily verified that inequality (11) is true if 'add_bits' is greater than or equal to one for half-precision, single-precision, and double-precision floating-point. Similarly, it can be easily verified that inequality (12) is true if 'add_bits' is greater than or equal to two for half-precision, single-precision, and double-precision floating-point.

In other words, an extended exponent range with two additional bits may be sufficient to prevent a loss of information due to underflow and overflow after normalization when multiplying two half-precision, single-precision, or double-precision floating-point numbers based on a chosen bias of the extended exponent range.

It will be recognized by one skilled in the art, that the present exemplary embodiments may be practiced without some or all of these specific details. In other instances, well-known operations have not been described in detail in order not to unnecessarily obscure the present embodiments.

FIG. 1 shows a diagram of an illustrative integrated circuit such as programmable integrated circuit 100 in accordance with some embodiments.

Programmable integrated circuit 100 may have input-output circuitry 102 for driving signals off of programmable integrated circuit 100 and for receiving signals from other devices. Input-output circuitry 102 may include conventional input-output circuitry, serial data transceiver circuitry, differential receiver and transmitter circuitry, or other circuitry used to connect one integrated circuit to another integrated circuit.

As shown, input-output circuitry 102 may be located around the periphery of programmable integrated circuit 100. If desired, programmable integrated circuit 100 may have input-output circuitry 102 arranged in different ways. For example, input-output circuitry 102 may form one or more columns of input-output circuitry that may be located anywhere on the programmable integrated circuit (e.g., distributed evenly across the width of the programmable integrated circuit). If desired, input-output circuitry 102 may form one or more rows of input-output elements (e.g., distributed across the height of the programmable integrated circuit). Alternatively, input-output circuitry 102 may form islands of input-output elements that may be distributed over the surface of the programmable integrated circuit or clustered in selected areas.

Vertical interconnection resources 140 and horizontal interconnection resources 150 such as global and local vertical and horizontal conductive lines and buses may be used to route signals on programmable integrated circuit 100. Vertical and horizontal interconnection resources 140 and 150 include conductive lines and programmable connections between respective conductive lines and are therefore sometimes referred to as programmable interconnects, configurable interconnections, or configurable interconnect circuitry.

Programmable logic regions may include programmable components such as digital signal processing circuitry 120 and storage circuitry 130 which both may be organized in specialized blocks, or other combinational and sequential logic circuitry organized in logic array blocks 110. The programmable logic regions may be configured to perform a custom logic function. If desired, the digital signal processing circuitry 120 and storage circuitry 130 may have limited configurability. In some embodiments, the programmable logic region may include additional specialized blocks such as programmable phase-locked loop circuitry, programmable delay-locked loop circuitry, or other specialized blocks with limited configurability.

In some embodiments, digital signal processing circuitry 120 may be adaptable to efficiently implement floating-point operations with different precisions. For example, digital signal processing circuitry 120 may implement half-precision floating-point operations and/or single-precision floating-point operations and/or double-precision floating-point operations and/or quadruple-precision floating-point operations, etc.

In some embodiments, digital signal processing circuitry 120 may have an extended exponent range that may enable arithmetic operations on floating-point numbers of a predetermined precision, thereby avoiding the loss of information due to overflow or underflow. If desired, the extended exponent range may include two additional bits and a configurable bias. The extended exponent range may be adapted dynamically when needed. Alternatively, the extended exponent range may be implemented permanently throughout digital signal processing circuitry 120.

If desired, each block of digital signal processing circuitry 120 may implement one or more multiplication operations. A normalization circuit in digital signal processing circuitry 120 may generate a normalized, unrounded product of first and second floating-point numbers having an extended exponent range compared to the first and second floating-point numbers, and a rounding circuit may generate a normalized, rounded product of the first and second floating-point numbers having the same exponent range as the first and second floating-point numbers. In some embodiments, a multiplexer coupled to the rounding circuit and the normalization circuit may output a product of first and second floating-point numbers by selecting between the normalized, unrounded product and the normalized, rounded product based on a control signal.

Programmable integrated circuit 100 may include programmable memory elements. These memory elements can be loaded with configuration data (sometimes also referred to as programming data) using input-output circuitry 102. If desired, these memory elements may provide the control signal to the multiplexer in digital signal processing circuitry 120.

Once loaded, the memory elements each provide a corresponding static control signal that controls the operation of an associated logic component in a programmable logic region. In a typical scenario, the outputs of the loaded memory elements are applied to the gates of transistors in the programmable logic region to turn certain transistors on or off and thereby configure the logic and the routing paths in the programmable logic region. Programmable logic circuit elements that may be controlled in this way include parts of multiplexers (e.g., multiplexers used for forming routing paths in programmable interconnects), look-up tables, logic arrays, XOR, AND, OR, NAND, and NOR logic gates, pass gates, inverters, etc.

Memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements are loaded with configuration data during programming, memory elements are sometimes referred to as configuration memory, configuration RAM, or programmable memory elements.

The circuitry of programmable integrated circuit 100 may be organized using any suitable architecture. As an example, the logic of programmable integrated circuit 100 may be organized in a series of rows and columns of larger programmable logic regions each of which contains multiple smaller logic regions.

The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs) or slices. Each region of logic may include a pair of adders, a pair of associated registers, shift registers, and one or more look-up tables or other block of shared combinational logic (i.e., resources from a pair of LEs—sometimes referred to as adaptive logic elements (ALEs) in this context). The larger regions may be, for example, logic array blocks (LABs) or configurable logic blocks (CLBs) containing multiple logic elements or multiple ALMs or multiple slices.

During device programming, configuration data is loaded into programmable integrated circuit 100 that configures the programmable logic regions so that their logic resources perform desired logic functions.

Figure 2:
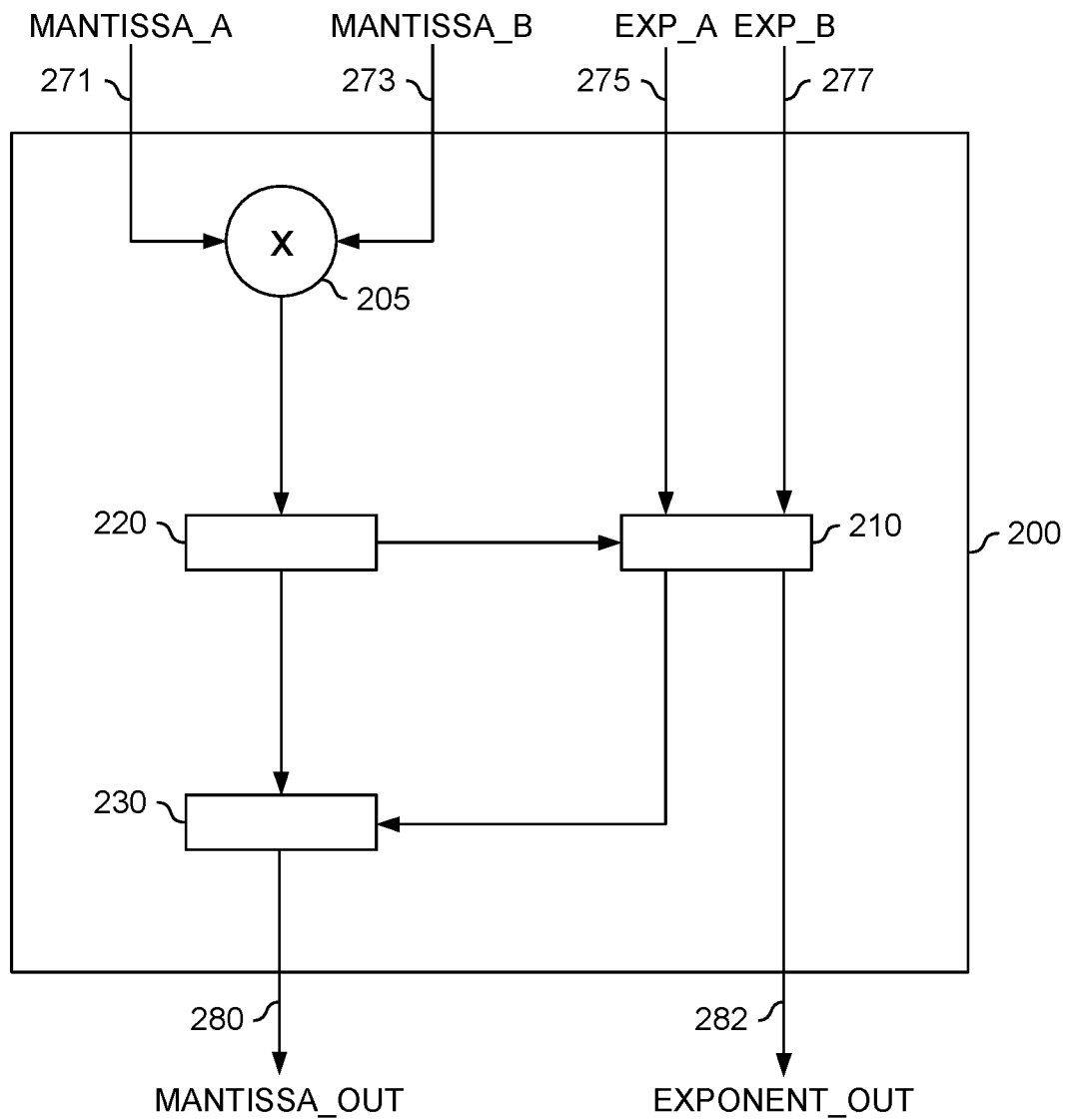
FIG. 2 is a diagram of an illustrative floating-point multiplier circuit in accordance with some embodiments.

FIG. 2 is a diagram of an illustrative floating-point multiplier circuit 200 in accordance with some embodiments.

As shown, floating-point multiplier circuit 200 may include input ports 271, 273, 275, and 277, output ports 280 and 282, multiplier stage 205, mantissa pre-normalization circuit 220, exponent handling circuit 210, and mantissa normalization circuit 230. Multiplier stage 205 may include two or more multiplier circuits, if desired.

Consider the scenario in which floating-point multiplier circuit 200 computes the product of first and second floating-point numbers that have respective mantissas (i.e., MANTISSA_A and MANTISSA_B) and respective exponents (i.e., EXP_A and EXP_B). If desired, none, one, or both of the first and second floating-point numbers may be denormalized floating-point numbers.

In this scenario, floating-point multiplier circuit 200 may receive signals MANTISSA_A, MANTISSA_B, EXP_A, and EXP_B at input ports 271, 273, 275, and 277, respectively. Multiplier stage 205 may compute a product of mantissas MANTISSA_A and MANTISSA_B and provide the mantissa product to pre-normalization circuit 220.

Pre-normalization circuit 220 may determine if the mantissa product requires a shift operation to establish an implicit leading one as required by the IEEE 754 standard. For example, pre-normalization circuit 220 may determine that the mantissa product is greater than or equal to decimal two, and thus, requires a right shift by one bit to establish the implicit leading one. As another example, pre-normalization circuit 220 may determine the number of leading zeros of the mantissa product, thereby determining the number of bits by which the mantissa product needs to be left shifted to establish the implicit leading one. Pre-normalization circuit 220 may provide the number of bits that the mantissa needs to be shifted and the direction of the shift to exponent handling circuit 210 and normalization circuit 230.

Exponent handling circuit 210 may determine a partial resulting exponent of the multiplication operation by adding signals EXP_A and EXP_B and adding or subtracting, based on the direction of the shift, the number of bits that the mantissa needs to be shifted.

If desired, exponent handling circuit 210 may determine whether the result of the multiplication would fall in either category of zero, infinity, NaN, or denormalized number as defined by the IEEE 754 standard. In response to determining that the result of the multiplication falls in either category of zero, infinity, NaN, or denormalized number as defined by the IEEE 754 standard, exponent handling circuit 210 may adjust the exponent range by adding extra bits to the exponent, as an example. If desired, exponent handling circuit 210 may adjust the bias when adjusting the exponent range.

Control signals may control the decision to adjust the exponent range and/or the bias. If desired, control signals may control the extend of the adjustment of the exponent range (i.e., the number of extra exponent bits) and/or the method of adjusting the bias, such as doubling the bias for every extra bit, inserting a '1' at the LSB of the bias for every extra bit, or fixing the bias to a predetermined percentage of the maximal representable number of the extended exponent, just to name a few.

The control signals may be generated by logic circuits that dynamically control the adjustment of the exponent range and/or the bias. The logic circuits and/or storage circuits may be located inside floating-point multiplier circuit 200. If desired, some or all of the logic circuits and/or storage circuits may be located outside of floating-point multiplier circuit 200 and the control signals may be provided to exponent handling circuit 210 through additional input ports.

The control signals may be stored individually or in groups. The storage circuits may load the control signals during configuration or reconfiguration of floating-point multiplier circuit 200. In some embodiments, the storage circuits may be programmable memory elements of an integrated circuit (e.g., programmable integrated circuit 100 of FIG. 1).

In some embodiment, exponent handling circuit 210 may adjust the exponent range and/or adjust the bias independent of whether the multiplication would fall in either category of zero, infinity, NaN, or denormalized number as defined by the IEEE 754 standard. For example, exponent handling circuit 210 may add a predetermined number of extra bits to the exponent and/or adjust the bias by a predetermined amount.

If desired, exponent handling circuit 210 may determine the resulting exponent of the multiplication (i.e., signal EXPONENT_OUT) based on the partial resulting exponent and provide the signal to output port 282. For example, exponent handling circuit 210 may output the partial resulting exponent as the resulting exponent of the multiplication when exponent handling circuit 210 skips adjusting the exponent range and adjusting the bias.

As another example, exponent handling circuit 210 may subtract the old bias (i.e., the bias before the bias adjustment) and add the new bias (i.e., the bias after the bias adjustment) to the previously determined resulting exponent of the multiplication operation to determine the resulting exponent of the multiplication (i.e., signal EXPONENT_OUT).

Exponent handling circuit 210 may send a status signal to normalization circuit 230 indicating whether the multiplication without exponent adjustment would fall in either category of zero, infinity, NaN, or denormalized number as defined by the IEEE 754 standard and if yes whether exponent adjustment and/or bias adjustment has occurred.

In response to receiving the status signal from exponent handling circuit 210, normalization circuit 230 may normalize the mantissa product received from pre-normalization circuit 210. For example, normalization circuit 230 may shift the mantissa product based on the number of bits that the mantissa needs to be shifted and the direction that pre-normalization circuit 210 provided to establish the leading one. In some embodiments, normalization circuit 230 may adjust the mantissa product to output a zero, infinity, NaN, or a denormalized number.

Figure 3:
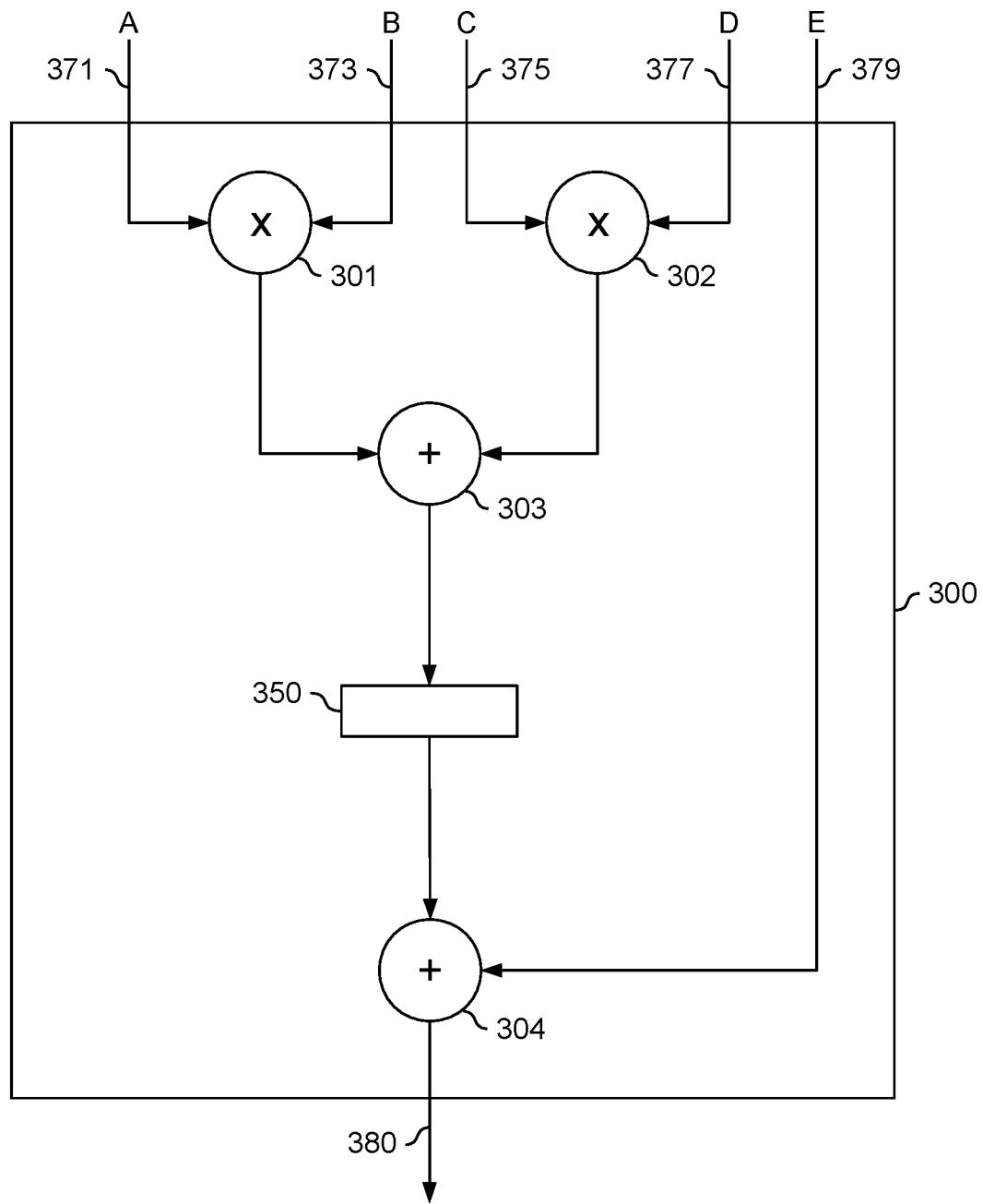
FIG. 3 is a diagram of an illustrative specialized processing blocks with two multiplier circuits and two adder circuits in accordance with some embodiments.

FIG. 3 is a diagram of an illustrative specialized processing blocks that may implement mixed-precision floating-point arithmetic operations using two multiplier circuits and two adder circuits in accordance with some embodiments.

In this logical representation, implementation details, such as registers and some programmable routing features, such as multiplexers and routes that may allow the output of a particular structure to be routed around certain components or directly out of the specialized processing block, are omitted to simplify discussion. In addition, some elements that are shown may, in an actual embodiment, be implemented more than once. For example, multiplier 302 may actually be built using two or more multipliers.

As shown, specialized processing block 300 may include input ports 371, 373, 375, 377, and 379, output port 380, multiplier circuit 301 and 302, adder circuits 303 and 304, and cast function circuit 350. Specialized processing block 300 may produce output signals at output port 380 and receive input signals at input ports 371, 373, 375, 377, and 379.

In some embodiments, adder circuit 303 and multiplier circuits 301 and 302 may operate on floating-point numbers of a first floating-point precision (e.g., according to the IEEE 754 standard, half-precision, single-precision, double-precision, quadruple-precision, or octuple-precision), and adder circuit 304 may operate on floating-point numbers of a second floating-point precision (e.g., according to the IEEE 754 standard, half-precision, single-precision, double-precision, quadruple-precision, or octuple-precision). If desired, the second floating-point precision may be different than the first floating-point precision.

As an example, the second floating-point precision may be a higher precision than the first floating-point precision. For example, according to the IEEE 754 standard, the second floating-point precision may be single-precision, double-precision, quadruple-precision, or octuple-precision if the first floating-point precision is half-precision; the second floating-point precision may be double-precision, quadruple-precision, or octuple-precision if the first floating-point precision is single-precision; the second floating-point precision may be quadruple-precision or octuple-precision if the first floating-point precision is double-precision, or the second floating-point precision may be octuple-precision if the first floating-point precision is quadruple-precision.

In some embodiments, cast function circuit 350 may convert the output of adder circuit 303 from the first floating-point precision into the second floating-point precision. For example, the output of adder circuit 303 may be a half-precision floating-point number and cast function circuit may convert the sum of products to a single-precision floating-point number.

To convert a floating-number from a first floating-point precision to a second floating-point precision that is higher than the first floating-point precision, which is sometimes also referred to as an up conversion, cast function circuit 350 may increase the number of bits of the mantissa and the number of bits of the exponent and adjust the bias of the exponent accordingly. For example, to convert a half-precision floating-point number to a single-precision floating-point number, cast function circuit 350 may increase the size of the mantissa from 10 bits to 23 bits (e.g., by adding 13 zeros to the right of the least significant bit (LSB) position) and the size of the exponent from 5 bits to 8 bits (e.g., by adding 3 zeros to the left of the most significant bit (MSB) position). As another example, the output of adder circuit 303 may not be rounded and include additional bits such as round, guard, and sticky bits, and cast function circuit 350 may add zeros to the right of the additional bits until the size of the mantissa reaches 23 bits. Cast function circuit 350 may adjust the bias of the exponent by adding 112 to the half-precision floating-point exponent.

If desired, cast function circuit 350 may include conversion of special cases (e.g., the first floating-point precision number may be denormalized, zero, infinity, or not a number (NaN)). As an example, a denormalized first floating-point precision number may be converted into a zero, which is sometimes also referred to as denormals-are-zero (DAZ). As another example, in down conversion, zero, a denormal, or too big of an exponent underflow may be converted to zero, and infinity or an exponent overflow may be converted to infinity.

In some embodiments, configurable interconnect circuitry in specialized processing block 300 may route signals between input ports 371, 373, 375, 377, and 379, output port 380, multiplier circuits 301 and 302, adder circuits 303 and 304, and cast function circuit 350. The configurable interconnect circuitry may include multiplexers and interconnections, which are sometimes also referred to as routing tracks. The configurable interconnect circuitry may be used to bypass some of the components of specialized processing block 300.

Control signals may control the selection performed by the multiplexers. The control signals may be generated by logic circuits that dynamically control the selection of the respective multiplexers and/or stored in storage circuits. The logic circuits and/or storage circuits may be located inside specialized processing block 300. If desired, some or all of the logic circuits and/or storage circuits may be located outside of specialized processing block 300 and the control signals may be provided to the respective multiplexers through additional input ports.

The control signals may be stored individually for each multiplexer or in groups for multiple multiplexers. The storage circuits may load the control signals during configuration or reconfiguration of specialized processing block 300. In some embodiments, the storage circuits may be programmable memory elements of an integrated circuit (e.g., programmable integrated circuit 100 of FIG. 1).

In the logical representation of FIG. 3, specialized processing block 300 may implement a fixed-point addition, a floating-point addition, a fixed-point multiplication, a floating-point multiplication, a sum of two multiplications in a first floating-point precision, with or without casting to a second floating-point precision and the latter followed by a subsequent addition in the second floating-point precision, if desired, etc.

Consider the scenario in which specialized processing block 300 receives input signals A, B, C, D, and E at input ports 371, 373, 375, 377, and 379. Consider further that input signals A, B, C, and D are signals encoding floating-point numbers of a first floating-point precision (e.g., half-precision, single-precision, double-precision, or quadruple-precision, according to the IEEE 754 standard) and input signal E a signal encoding a floating-point number of a second floating-point precision that is a higher precision than the first floating-point precision (e.g., single-precision if the first floating-point precision is half-precision, double-precision if the first floating-point precision is single-precision, quadruple-precision if the first floating-point precision is double-precision, or octuple-precision if the first floating-point precision is quadruple-precision, according to the IEEE 754 standard).

In this scenario, multiplier circuit 301 may compute the product of A and B (i.e., A*B) and multiplier circuit 302 the product of C and D (i.e., C*D). If desired, multiplier circuit 301 and/or multiplier circuit 302 may include a normalization circuit, a rounding circuit, and a multiplexer. The normalization circuit may generate a normalized, unrounded product of the respective floating-point numbers A, B and C, D, using an extended exponent range and/or bias adjustment, for example. The rounding circuit may generate a normalized, rounded product of the respective floating-point numbers, and the multiplexer may select between the normalized, unrounded product and the normalized, rounded product based on a control signal.

Adder circuit 303 may generate the sum of the products (i.e., A*B+C*D). In some embodiments, cast function circuit 350 may convert the sum of products from the first floating-point precision to the second floating-point precision. For example, the sum of products may be a half-precision floating-point number and cast function circuit may convert the sum of products to a single-precision floating-point number.

Adder circuit 304 may add the sum of products to signal E from input port 379 to generate another sum signal. The configurable interconnect circuitry may route the sum from adder circuit 304 to output 380.

In some embodiments, multiplier circuits such as multiplier circuits 301 and 302 or multiplier circuit 205 of FIG. 2 may include a partial product generator and multiplier output circuitry. The partial product generator may generate a partial product of two floating-point numbers and output the partial product in form of sum and carry vectors, if desired, and the multiplier output circuitry may generate the product of the two floating-point numbers based on the partial product.

Figure 4:
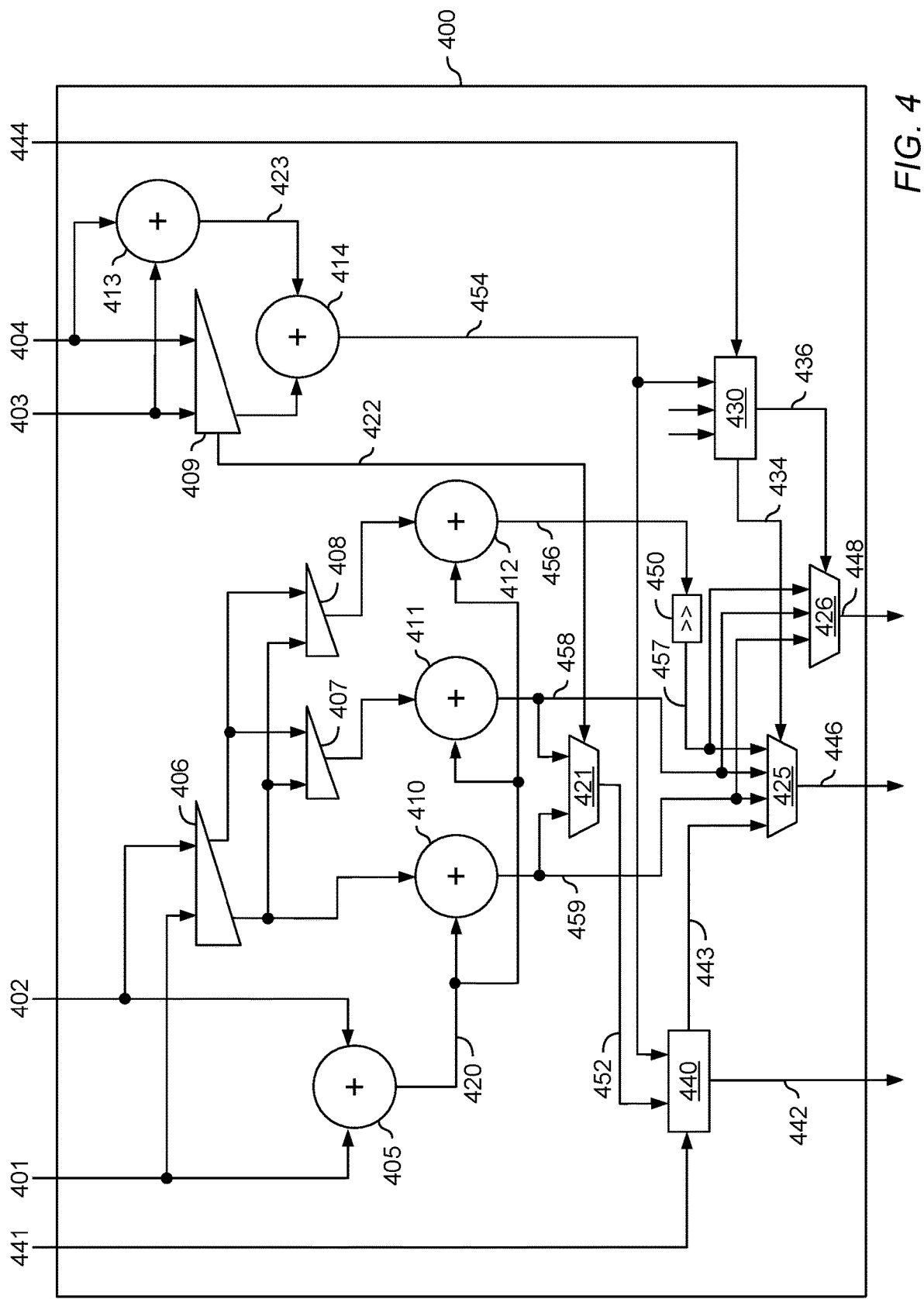
FIG. 4 is a diagram of an illustrative multiplier output circuit including a normalization circuit, a rounding circuit, and a multiplexer to select between a normalized, unrounded product and a normalized, rounded product in accordance with some embodiments.

FIG. 4 is a diagram of an illustrative multiplier output circuit including a normalization circuit, a rounding circuit, and a multiplexer to select between a normalized, unrounded product and a normalized, rounded product in accordance with some embodiments.

As shown in this logical representation, multiplier output circuit 400 may include multiplexers 421, 425, and 426, prefix networks 406, 407, 408, and 409, logic exclusive OR circuitries 405, 410, 411, 412, 413, and 414, right shift circuit 450, output selection control circuit 430, and normalization circuit 440.

Each prefix network of prefix networks 406, 407, 408, and 409 may be, for example, a Kogge-Stone prefix network or any other prefix network such as a Brent-Kung prefix network or a Han Carlson prefix network, just to name a few, which outputs respective generate and propagate signals.

Multiplier output circuit 400 may receive a partial product generated by upstream circuitry as two signals at inputs 401, 402, 403, and 404. For example, multiplier output circuit 400 may receive a sum vector at inputs 401 and 403 and a carry vector at inputs 402 and 404.

Inputs 401 and 403 may each receive the entire sum vector, or each of inputs 401 and 403 may receive a portion of the sum vector. The portions of the sum vector received at inputs 402 and 403 may overlap or be disjoint, if desired. Similarly, inputs 402 and 404 may each receive the entire carry vector, or each of inputs 402 and 404 may receive a portion of the carry vector. The portions of the carry vector received at inputs 402 and 404 may overlap or be disjoint, if desired.

To accommodate normalization and rounding, it may be necessary to add either zero, one or two to the least significant bit(s) of the result (which may be referred to as the sum). Specifically, normalization may involve a right shift of zero bits or one bit (if the result is greater than or equal to decimal 1.0 and less than decimal 2.0, the right shift is zero bits; if the result is greater than or equal to decimal 2.0 and less than decimal 4.0 the right shift is one bit). In cases where rounding is not applied, whether the normalization is 0 bit or 1 bit, the sum-plus-zero (i.e., the sum) may be used. In cases where rounding is applied, then if the normalization is zero bits, the sum-plus-one may be used, while if the normalization is one bit, the sum-plus-two may be used.

If desired, multiplier output circuit 400 may generate sum-plus-zero, sum-plus-one, and sum-plus-two as normalized, rounded signals sum-plus-zero signal 459, sum-plus-one signal 458, and sum-plus-two signal 457, respectively. In other words, rounding circuitry in multiplier output circuit 400 may generate a normalized, rounded product of two floating-point numbers by selecting between three pre-calculated value signals.

Logic exclusive OR circuitry 405 may generate signal 420 by performing a bitwise logical exclusive OR of the signals received at inputs 401 and 402. Similarly, logic exclusive OR circuitry 413 may generate signal 423 by performing a bitwise logical exclusive OR of the signals received at inputs 403 and 404.

As shown, prefix network 406 may receive the signals from inputs 401 and 403, and prefix network 409 may receive the signals from inputs 402 and 404. Prefix networks 406 and 409 may generate a respective generate signal for each signal pair from inputs 401, 402 and 403, 404, respectively.

Logic exclusive OR circuitry 410 may generate logical exclusive OR signal 459 by performing a logical exclusive OR of the generate signal from prefix networks 406 and signal 420 from logic exclusive OR circuitry 405, thereby generating the upper sum portion of the product (i.e., sum-plus-zero signal 459), and logic exclusive OR circuitry 414 may perform a logical exclusive OR of the generate signals from prefix networks 409 and signals 423 from logic exclusive OR circuitry 413, thereby generating the lower sum portion of the product (i.e., signal 454).

Prefix networks 407 and 408, in conjunction with logic exclusive OR circuitries 411 and 412, may generate the upper sum portion plus one (i.e., sum-plus-one signal 458) and the upper sum portion plus two (i.e., sum-plus-two signal 456), respectively.

If desired, right shift circuit 450 may shift sum-plus-two signal 456 one bit to the right, thereby generating right shifted sum-plus-two signal 457. Multiplexer 421 may generate a selected upper sum portion of the product (i.e., signal 452) by selecting between signal sum-plus-zero 459 and signal sum-plus-one 458 based on carry signal 422 from prefix network 409. For example, multiplexer 421 may select signal sum-plus-one 458 if carry signal 422 is one and signal sum-plus-zero 459 if carry signal 422 is zero.

Figure 5:
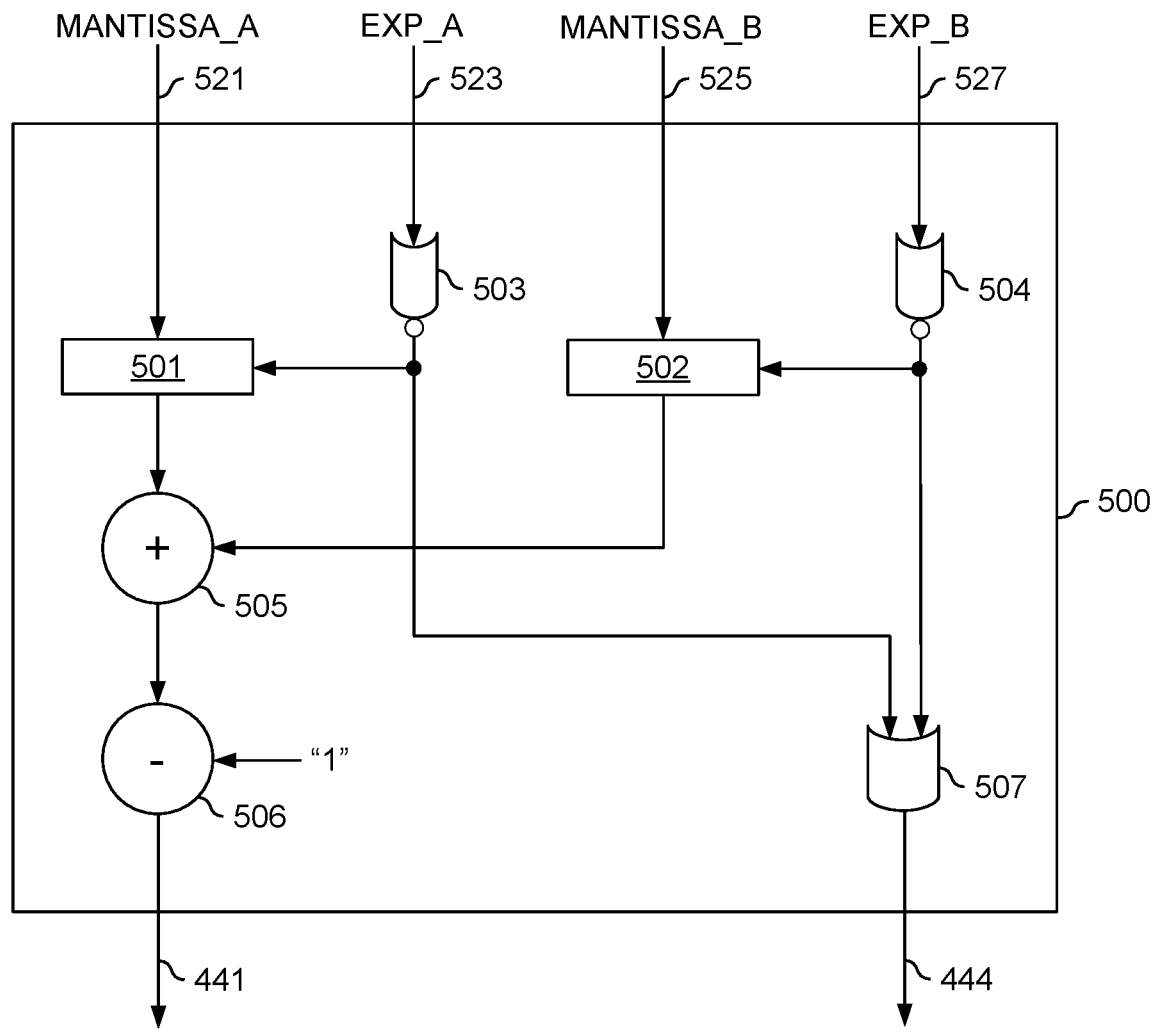
FIG. 5 is a diagram of an illustrative control circuit in accordance with some embodiments.
Figure 6:
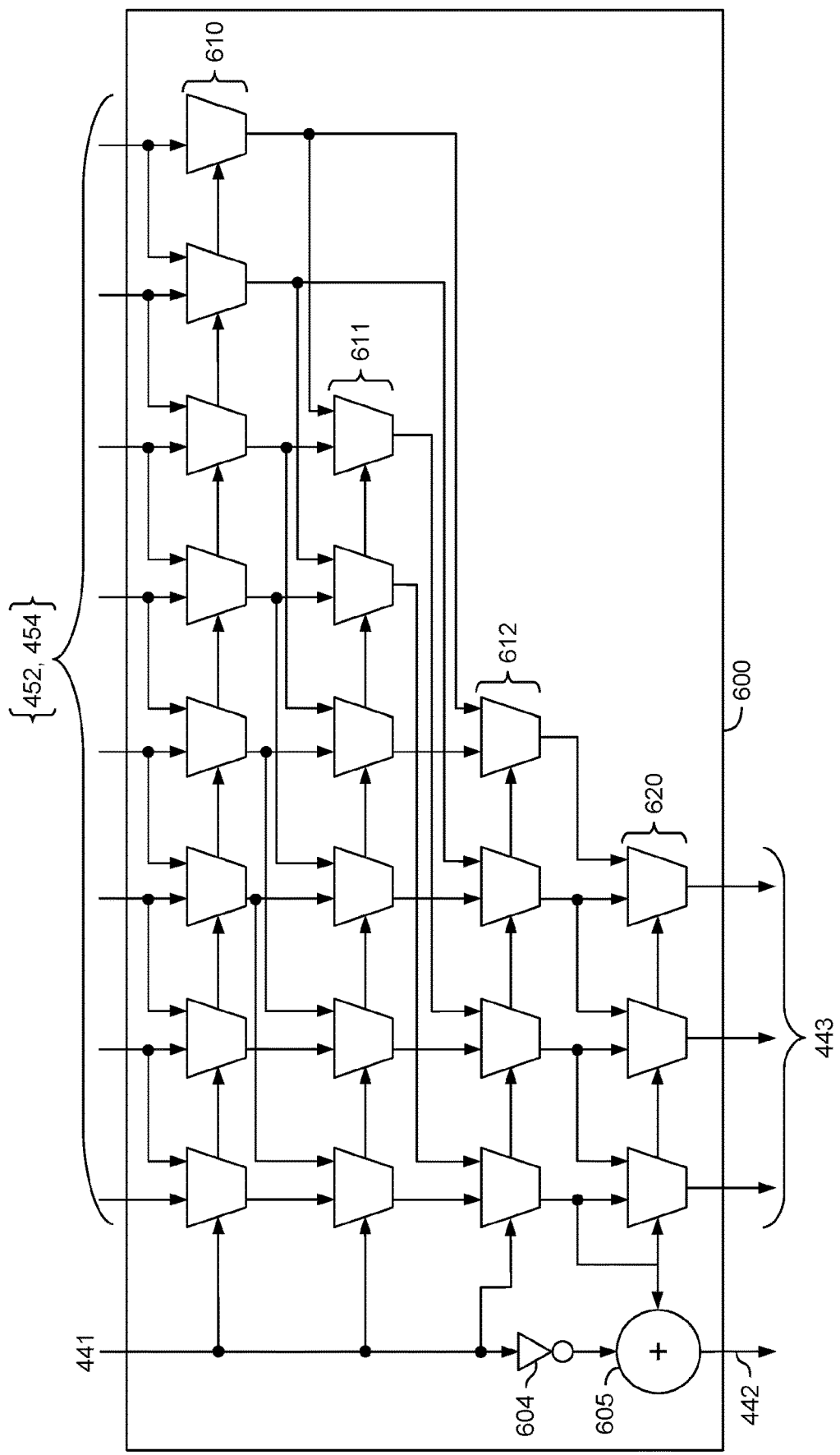
FIG. 6 is a diagram of an illustrative normalization circuit in accordance with some embodiments.

Normalization circuit 440 may receive the selected upper sum portion of the product (i.e., signal 452) from multiplexer 421, the lower sum portion of the product (i.e., signal 454) from logic exclusive OR circuitry 414, and coarse shift value signal 441 from a control circuit, an embodiment of which is shown in FIG. 5, and generate normalized value signal 443 and exponent adjustment value signal 442 based on the received signals. If desired, normalized value signal 443 may be unrounded, and exponent adjustment value signal 442 may be adapted to an extended exponent range. An embodiment of an illustrative normalization circuit that generates normalized value signal 443 and exponent adjustment value signal 442 is shown in FIG. 6 below.

If desired, normalization circuit 440 may always generate normalized value signal 443 as having an implicit leading one, thereby implicitly assuming that exponent adjustment and/or bias adjustment may have occurred, if required, and that therefore the resulting product does not fall in either category of zero, infinity, NaN, or denormalized number as defined by the IEEE 754 standard.

Multiplexer 425 may select the product 446 of two floating-point numbers among normalized value signal 443 and normalized, rounded signals sum-plus-zero 459, sum-plus-one 458, and right shifted sum-plus-two 457 based on a control signal from output selection control circuit 430. Multiplexer 426 may select the product 448 among normalized, rounded signals sum-plus-zero 459, sum-plus-one 458, and right shifted sum-plus-two 457 based on another control signal from output selection control circuit 430.

Product 448 may be used when exponent adjustment is undesired and/or when special handling is desired in response to the product falling in either category of zero, infinity, NaN, or denormalized number as defined by the IEEE 754 standard. For example, product 448 may be flushed to zero in response to the product being zero as defined by the IEEE 754 standard.

Output selection control circuit 430 may receive the lower sum portion of the product (i.e., signal 454) from logic exclusive OR circuitry 414 and normalization indication signal 444 from an additional control circuit, an embodiment of which is shown in FIG. 5 below. If desired, normalization indication signal 444 may indicate whether at least one of the two floating-point numbers is a denormalized number.

Output selection control circuit 430 may receive additional control signals that select between using exponent adjustment and/or bias adjustment or special handling such as flush to zero when the product falls in either category of zero, infinity, NaN, or denormalized number as defined by the IEEE 754 standard.

The additional control signals may be dynamically generated by logic circuits or stored in storage circuits. The logic circuits and/or storage circuits may be located inside multiplier output circuit 400. If desired, some or all of the logic circuits and/or storage circuits may be located outside of multiplier output circuit 400. In some embodiments, the storage circuits may load the control signals during configuration or reconfiguration of multiplier output circuit 400. In some embodiments, the storage circuits may be programmable memory elements of an integrated circuit (e.g., programmable integrated circuit 100 of FIG. 1).

As mentioned in connection with FIG. 4, an embodiment of an illustrative control circuit 500 that generates a coarse shift value signal 441 and a normalization indication signal 444 is shown in FIG. 5. As shown, control circuit 500 includes count leading zeros (CLZ) circuits 501 and 502, logical NOR circuits 503 and 504, logical OR circuit 507, adder circuit 505, and subtractor circuit 506.

Control circuit 500 may receive the mantissa and exponent of a first floating-point number (i.e., MANTISSA_A and EXP_A) at input ports 521 and 523, respectively, and the mantissa and exponent of a second floating-point number (i.e., MANTISSA_B and EXP_B) at input ports 525 and 527, respectively.

Logical NOR circuit 503 may perform a logical NOR operation of the exponent bits of the first floating-point number (i.e., EXP_A) to determine whether the first floating-point number is a denormalized number. A denormalized number has a zero exponent, and the output of logical NOR circuit 503 is one if all bits of EXP_A are zero. The output of logical NOR circuit 503 is zero if at least one bit of signal EXP_A is one.

Similarly, logical NOR circuit 504 may perform a logical NOR operation of the exponent bits of the second floating-point number (i.e., EXP_B) to determine whether the second floating-point number is a denormalized number. The output of logical NOR circuit 504 is one if all bits of signal EXP_B are zero and zero if at least one bit of signal EXP_B is one.

The use of logical NOR circuits 503 and 504 is merely illustrative and other implementations are possible. For example, a logical AND circuit with inverted inputs may replace either or both of logical NOR circuits 503 and 504. As another example, signals out of logical NOR circuits 503 and/or 504 may be inverted (e.g., the output may be one if at least one bit of signal EXP_A and/or EXP_B is one) by adding an inverter or by replacing logical NOR circuits 503 and/or 504 by logical OR gates. In the latter example, count leading one circuits 501 and 502 and logical OR circuit 507 may be modified accordingly.

Logical OR circuit 507 may determine whether either of the first and second floating-point numbers is a denormalized number and provide the corresponding information as normalization indication signal 444. For example, logical OR circuit 507 may perform a logical OR operation of the signals from logical NOR gates 503 and 504. In the example in which the output of logical NOR circuits 503 and 504 are one if all bits of respective signals EXP_A and EXP_B are zero, logical OR circuit 507 may provide a one if either or both of signals EXP_A or EXP_B are zero. In other words, normalization indication signal 444 is one if at least one of the first and second floating-point numbers is a denormalized number.

Count leading zeros circuit 501 may count the leading zeros of signal MANTISSA_A. If desired, count leading zeros circuit 501 may only be enabled to count the leading zeros of signal MANTISSA_A if the output of logical NOR circuit 503 indicates that the first floating-point number is a denormalized number and output a zero if the output of logical NOR circuit 503 indicates that the first floating-point number is not a denormalized number. In some embodiments, additional circuitry may handle the case in which both signals, MANTISSA_A and EXP_A, are zero (i.e., the case in which the first floating-point number represents zero).

Similarly, count leading zeros circuit 502 may count the leading zeros of signal MANTISSA_B. If desired, count leading zeros circuit 502 may only be enabled to count the leading zeros of signal MANTISSA_B if the output of logical NOR circuit 504 indicates that the second floating-point number is a denormalized number and output a zero if the output of logical NOR circuit 504 indicates that the first floating-point number is not a denormalized number. In some embodiments, additional circuitry may handle the case in which both signals, MANTISSA_B and EXP_B, are zero (i.e., the case in which the second floating-point number represents zero).

Adder circuit 505 may generate the sum of the outputs of count leading zeros circuits 501 and 502, thereby determining a coarse estimate of the number of left shift operations during normalization that are due to the leading zeros in unnormalized mantissas.

Subtractor circuit 506 may decrement the sum of the outputs of count leading zeros circuits 501 and 502 by one. For example, the multiplication of two floating-point numbers may produce a mantissa product that exceeds decimal 2.0. Thus, a normalization operations may require one bit shift less for normalization. For example, 0.0001000111*0.0001001100 may generate a mantissa product that is smaller than 2.0, while 0.0001111001*0.0001110101 may generate a mantissa product that is greater than decimal 2.0.

Subtractor circuit 506 may provide the decremented sum as coarse shift value signal 441 at an output of control circuit 500. Normalization circuit 440 of FIG. 4 may receive coarse shift value signal 441 and perform a left shift operation based on the received signal.

FIG. 6 is a diagram of an illustrative normalization circuit 600 in accordance with some embodiments. As shown, normalization circuit 600 may include left shift circuits 610, 611, 612, and 620, inverter 604, and adder circuit 605. Each left shift circuit of left shift circuits 610, 611, and 612 may include a plurality of multiplexers that select between a first signal received from the same bit position of a previous left shift circuit and a second signal received from a bit position that is a predetermined distance to the right of the current bit position in the previous left shift circuit.

Normalization circuit 600 may receive coarse shift value signal 441 and the signal to be normalized {452, 454} (e.g., the selected upper sum portion of the product (i.e., signal 452) concatenated with the lower sum portion of the product (i.e., signal 454) of FIG. 4), and generate normalized value signal 443 and exponent adjustment value signal 442 based on the received signals.

The signal to be normalized {452, 454} may be larger than shown in FIG. 6, and thus normalization circuit 600 may have additional left shift circuits (i.e., normalization circuit 600 may be deeper than shown). The width of the signal to be normalized {452, 454} may depend on the width of the mantissas of the two floating-point numbers. For example, the signal to be normalized may have twice the width of the mantissas of the two floating-point numbers.

In the example of FIG. 6, normalization circuit 600 may have three left shift circuits 610, 611, and 612 that are each controlled by one bit of coarse shift value signal 441. Thus, coarse shift value signal 441 may be 3-bits wide and shift the signal to be normalized {452, 454} up to seven bits to the left.

The least significant bit (LSB) of coarse shift value signal 441 may control left shift circuit 610 and shift the signal to be normalized {452, 454} by $2^0$ bit positions (i.e., by one bit) to the left. The second LSB of coarse shift value signal 441 may control left shift circuit 611 and shift the signal from left shift circuit 610 by $2^1$ bit positions (i.e., by two bits) to the left, and the MSB of coarse shift value signal 441 may control left shift circuit 612 and shift the signal from left shift circuit 611 by $2^2$ bit positions (i.e., four bits) to the left.

Thus, N left shift circuits may perform N left shift operations that are controlled by N bits of coarse shift value signal 441, whereby each stage k of the N left shift circuits with k=1, . . . , N is controlled by bit k=1, . . . , N (from LSB to MSB) of the coarse shift value signal. Each stage k of the N left shift circuits may shift the bit from the previous left shift circuit k−1 by zero bits to the left if bit k of the coarse shift value signal is zero and by $2^{(k-1)}$ bits to the left if bit k of the coarse shift value signal is one.

One additional left shift operation by one bit position may be required at the output of left shift circuit 612 if the signal out of the leftmost multiplexer of left shift circuit 612 is zero. In other words, if the MSB of the left shifted signal has no leading one, an additional left shift operation is required. Left shift circuit 620 may perform the additional left shift operation based on the MSB of the left shifted signal, thereby generating normalized value signal 443.

Inverter 604 may invert coarse normalization value signal 441 to generate a 1's complement value of the exponent adjustment, thereby generating the negative of the sum generated by adder circuit 505 of FIG. 5. Adder 605 may generate exponent adjustment value signal 442 by adding the MSB of the left shifted signal from left shift circuit 612 to the 1's complement of the exponent adjustment.

In some embodiments, such as in specialized processing block 300 of FIG. 3, an adder circuit such as adder circuit 303 may compute the sum of two products. Such an adder circuit may add the product 446 of the multiplier output circuit 400 of FIG. 4 to another product 446 from another multiplier output circuit.

Figure 7:
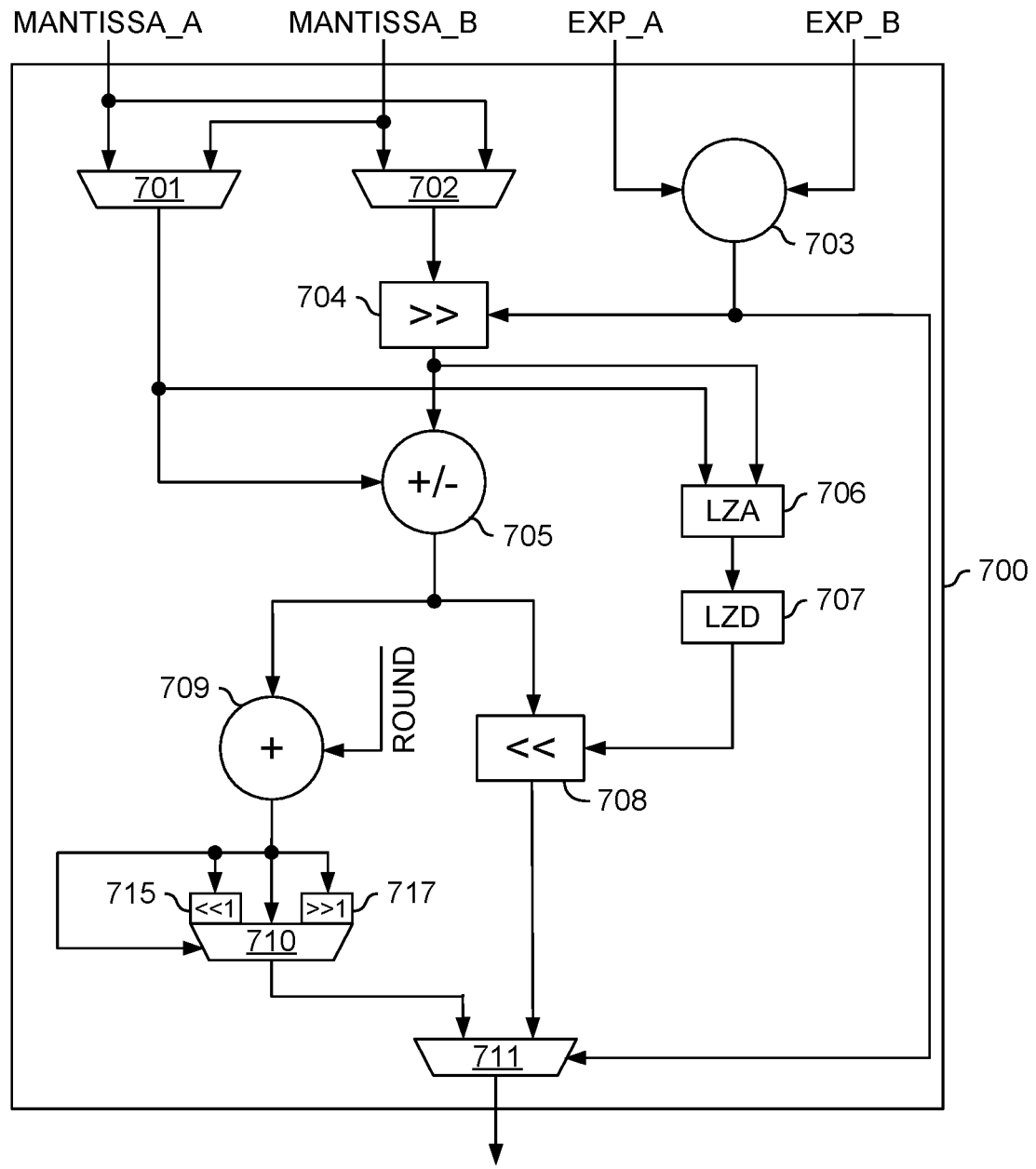
FIG. 7 is a diagram of adder circuitry for generating a sum of two floating-point numbers in accordance with some embodiments.

FIG. 7 is a diagram of adder circuitry 700 that may generate the sum of two floating-point numbers A and B, which each have a mantissa (i.e., MANTISSA_A and MANTISSA_B) and an exponent (i.e., EXP_A and EXP_B). The two floating-point numbers may both be normalized or denormalized or one of the two floating-point numbers may be normalized while the other floating-point number is denormalized. If desired, none, one or both of floating-point numbers A and B may have an expanded exponent range as described above. In some embodiments, at least one of the two floating-point numbers received by adder circuitry 700 is a product generated by multiplier output circuit 400 of FIG. 4.

As shown, adder circuitry 700 may include multiplexers 701, 702, 710, and 711, comparator 703, right shift circuits 704 and 717, left shift circuits 708 and 715, adder-subtractor circuit 705, adder circuit 709, leading zero anticipator (LZA) circuit 706, and leading zero detector (LZD) circuit 707.

Right shift circuit 704, adder-subtractor circuit 705, adder circuit 709, left shift circuit 715, right shift circuit 717, and multiplexer 710 may together implement the far path of a dual path adder, while right shift circuit 704, leading zero anticipator (LZA) circuit 706, lead zero detector (LZD) circuit 707, and left shift circuit 708 implement the near path of a dual path adder.

Multiplexer 711 may select between the addition performed on the far path and the addition performed on the near path based on a control signal. The control signal may direct multiplexer 711 to select the addition performed on the far path if the exponents EXP_A and EXP_B differ by more than one. If the exponents differ by one or less, the control signal may direct multiplexer 711 to select the addition performed on the near path.

Multiplexers 701 and 702 may receive the first and second mantissas (i.e., MANTISSA_A and MANTISSA_B), and comparator 703 may receive the first and second exponents (i.e., EXP_A and EXP_B). Comparator 703 may compare the two exponents (e.g., using a subtractor) to determine the smaller one of the first and second exponents.

The specialized processing block may use the result of the comparison as a control signal to control multiplexers 701 and 702 and right shift circuit 704. For example, multiplexer 701 may select among the two mantissas MANTISSA_A and MANTISSA_B the one that is associated with the greater exponent and multiplexer 702 the one that is associated with the smaller exponent.

Right shift circuit 704 may shift the smaller of the two mantissas a predetermined number of bits to the right, which may correspond to the absolute value of the difference between the exponents EXP_A and EXP_B (i.e., abs (EXP_A−EXP_B)).

Adder-subtractor circuit 705 may generate the sum of the outputs of multiplexers 701 and right shift circuit 704. The sum generated by adder-subtractor circuit 705 may then be normalized.

For example, leading zero anticipator (LZA) circuit 706 may predict the location of the MSB of the sum generated by adder-subtractor circuit 705 based on the inputs of adder-subtractor circuit 705. If desired, LZA circuit 706 may generate a string of bits with approximately the same number of leading zeros as the sum. Leading zero detector (LZD) circuit 707 may encode the output of LZA circuit 706 to determine the number of bit positions by which the sum may be left shifted in left shift circuit 708 to generate a normalized sum signal and by which the exponent needs to be adjusted.

If desired, the sum generated by adder-subtractor circuit 705 may be rounded. For example, adder circuit 709 may add a round bit to the sum generated by adder-subtractor circuit 705, after which an additional single bit normalization may be required.

Consider the scenario in which the output of adder circuit 709 (e.g., signal rnd_sum) is greater than or equal to one and smaller than two (i.e., 1.0≤rnd_sum<2.0). In this scenario, no additional single bit normalization is required and multiplexer 710 may select the output of adder circuit 709.

Consider another scenario in which the output of adder circuit 709 (e.g., signal rnd_sum) is greater than or equal to two and smaller than four (i.e., 2.0≤rnd_sum<4.0). In this scenario, a single bit normalization is required and the exponent may be incremented by one; right shift circuit 717 may shift signal rnd_sum one bit to the right, and multiplexer 710 may select the output of right shift circuit 717.

Consider yet another scenario in which the output of adder circuit 709 (e.g., signal rnd_sum) is greater than or equal to 0.5 and smaller than one (i.e., 0.5≤rnd_sum<1.0). In this scenario, a single bit normalization is required and the exponent may be decremented by one; left shift circuit 715 may shift signal rnd_sum one bit to the left, and multiplexer 710 may select the output of left shift circuit 715.

In some embodiments, the rounding of the sum generated by adder-subtractor circuit 705 may be bypassed and/or disabled. For example, the rounding of the sum may be bypassed and/or disabled if adder circuitry 700 is coupled to a cast function circuit (such as adder circuit 303 that is coupled to cast function circuit 350 of FIG. 3), and the cast function circuit converts the output of adder circuitry 700 from a first floating-point precision into a second, higher floating-point precision.

In some embodiments, multiplexer 711 may select the normalized sum signal from left shift circuit 708 if the sum generated by adder-subtractor circuit 705 is less than 0.5. In fact, no rounding may be necessary if the sum generated by adder-subtractor circuit 705 is less than 0.5.

Figure 8:
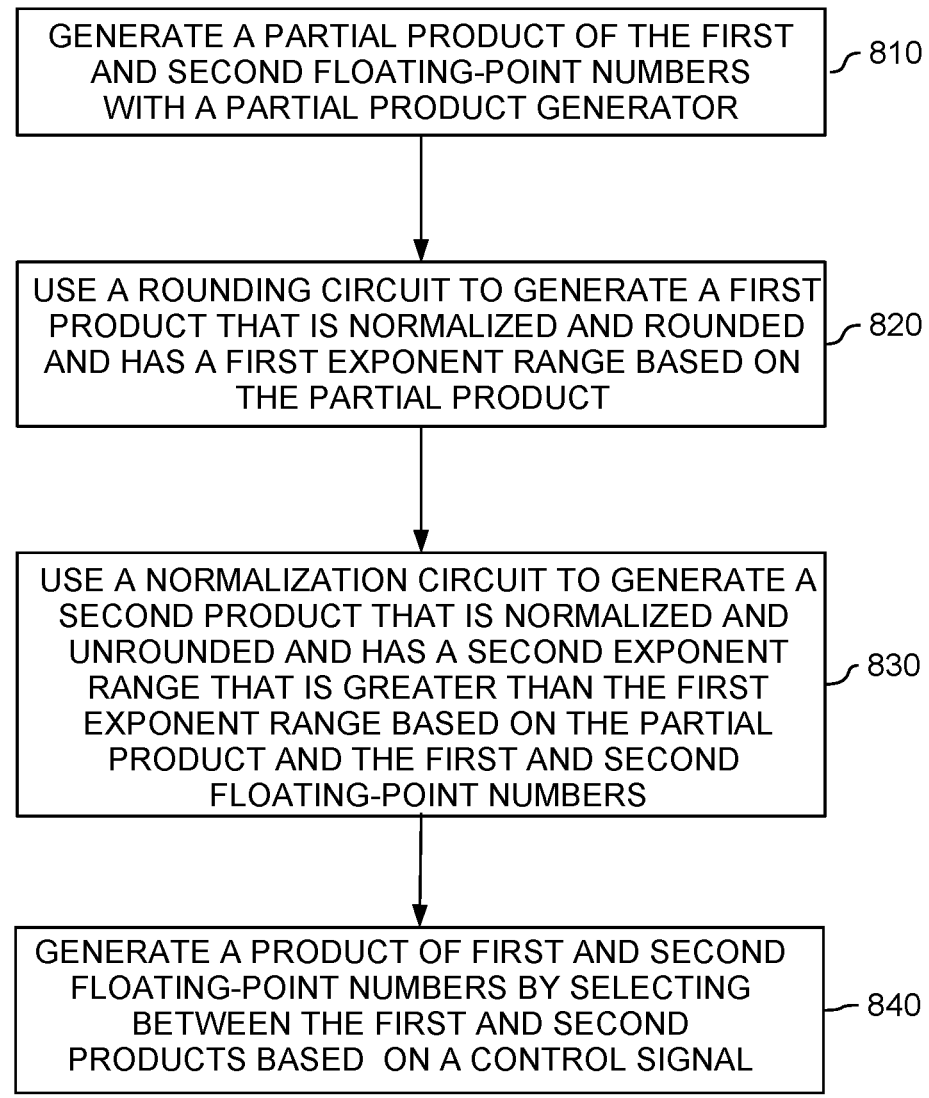
FIG. 8 is a diagram of a flow chart showing illustrative operations for performing an arithmetic operation of first and second floating-point numbers with an integrated circuit in accordance with some embodiments.

FIG. 8 is a diagram of a flow chart showing illustrative operations for performing an arithmetic operation of first and second floating-point numbers with an integrated circuit in accordance with some embodiments.

During operation 810, the integrated circuit may generate a partial product of the first and second floating-point numbers with a partial product generator. As an example, an integrated circuit such as programmable integrated circuit 100 of FIG. 1 may include floating-point multiplier circuit 200 of FIG. 2 or specialized processing block 300 of FIG. 3. Multiplier circuit 301 of FIG. 3 may generate a partial product of floating-point numbers A and B.

During operation 820, a rounding circuit in the integrated circuit may generate a first product that is normalized and rounded and has a first exponent range based on the partial product. As an example, circuitry in multiplier output circuit 400 may generate signals sum-plus-zero 459, sum-plus-one 458, and right shifted sum-plus-two 457, which anticipate the rounding operation of the product.

During operation 830, a normalization circuit in the integrated circuit may generate a second product that is normalized and unrounded and has a second exponent range that is greater than the first exponent range based on the partial product and the first and second floating-point numbers. As an example, normalization circuit 440 of FIG. 4 may generate normalized value signal 443 and exponent adjustment signal 442 based on selected upper sum portion of the product (i.e., signal 452), the lower sum portion of the product (i.e., signal 454), and coarse shift value signal 441, which is based on two floating-point numbers as shown in FIG. 5.

During operation 840, the integrated circuit may generate a product of first and second floating-point numbers by selecting between the first and second products based on a control signal. As an example, multiplexer 425 of FIG. 4 may select between the normalized value signal 443 and signals sum-plus-zero 459, sum-plus-one 458, and right shifted sum-plus-two 457 based on the control signal 434 from output selection control circuit 430 to generate the product of the two floating-point numbers.

A machine-readable medium may encode instructions for carrying out a method (e.g., instructions for configuring an integrated circuit to perform an arithmetic operation of first and second floating-point numbers or instructions for performing an arithmetic operation of first and second floating-point numbers with an integrated circuit as described by the method of FIG. 8) on an integrated circuit in accordance with some embodiments. A suitable computer or similar device may execute these instructions, thereby implementing the method in the integrated circuit. For example, a personal computer may be equipped with an interface to which the integrated circuit may be connected, and suitable software tools and/or a user, with the help of the personal computer, may program the method into the integrated circuit through the interface.

In some embodiments, the instructions for carrying out the method may be generated by other instructions that are encoded on the same or an additional machine-readable medium. In other words, a first set of instructions (e.g., a C-language compiler or an electronic design automation (EDA) tool) executed on a computer or similar device may generate a second set of instructions (e.g., assembler code or a series of bits for programming configurable circuitry), whereby the second set of instructions includes the method that is executed on an integrated circuit (e.g., a microprocessor or a programmable integrated circuit device such as programmable integrated circuit 100 of FIG. 1).

A machine-readable medium may include any type of device or technology that allows for the storage of instructions including semiconductor memory which may be volatile (e.g., dynamic random-access memory (DRAM), static random-access memory (SRAM), etc.) or non-volatile (e.g., programmable read-only memory (PROM), flash memory, etc.), magnetic storage devices, optical storage devices, or a combination thereof.

Figure 9:
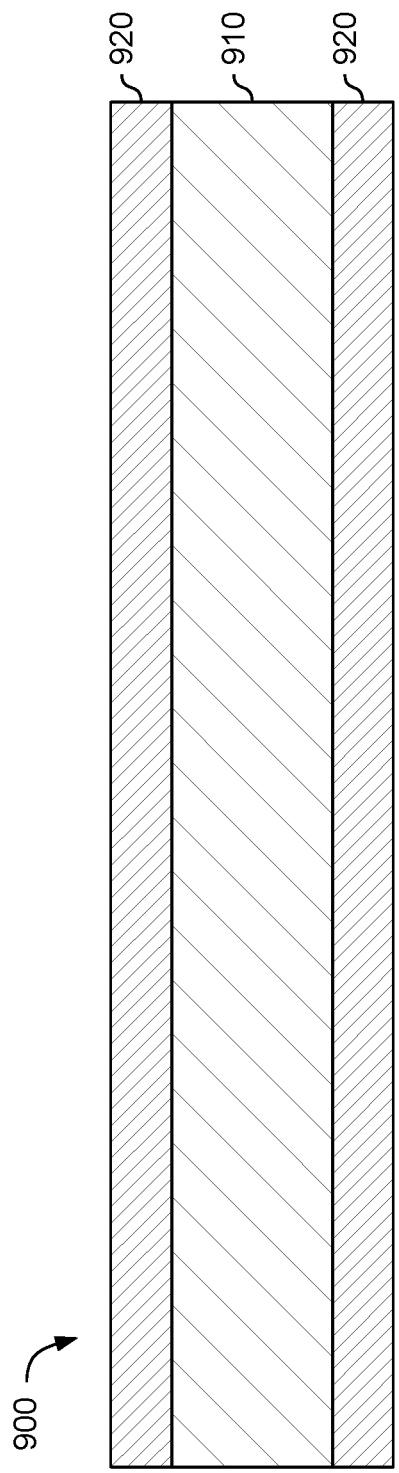
FIG. 9 is a cross-sectional view of a magnetic data storage medium encoded with a set of machine-executable instructions for configuring an integrated circuit to perform an arithmetic operation of first and second floating-point numbers in accordance with some embodiments.

FIG. 9 presents a cross section of a magnetic data storage medium 900 which may be encoded with a machine executable program that can be carried out by systems such as the aforementioned personal computer, or other computer or similar device. Medium 900 may be a floppy diskette or hard disk, or magnetic tape, having a suitable substrate 910, which may be conventional, and a suitable coating 920, which may be conventional, on one or both sides, containing magnetic domains whose polarity or orientation may be altered magnetically. Except in the case where it is magnetic tape, medium 900 may also have an opening for receiving the spindle of a disk drive or other data storage device.

The magnetic domains of coating 920 of medium 900 may be polarized or oriented so as to encode, in manner which may be conventional, a machine-executable program, for execution by a programming system such as a personal computer or other computer or similar system, having a socket or peripheral attachment into which the integrated circuit to be configured may be inserted for the purpose of configuring appropriate portions of the integrated circuit, including its specialized processing blocks, if any, in accordance with some embodiments.

Figure 10:
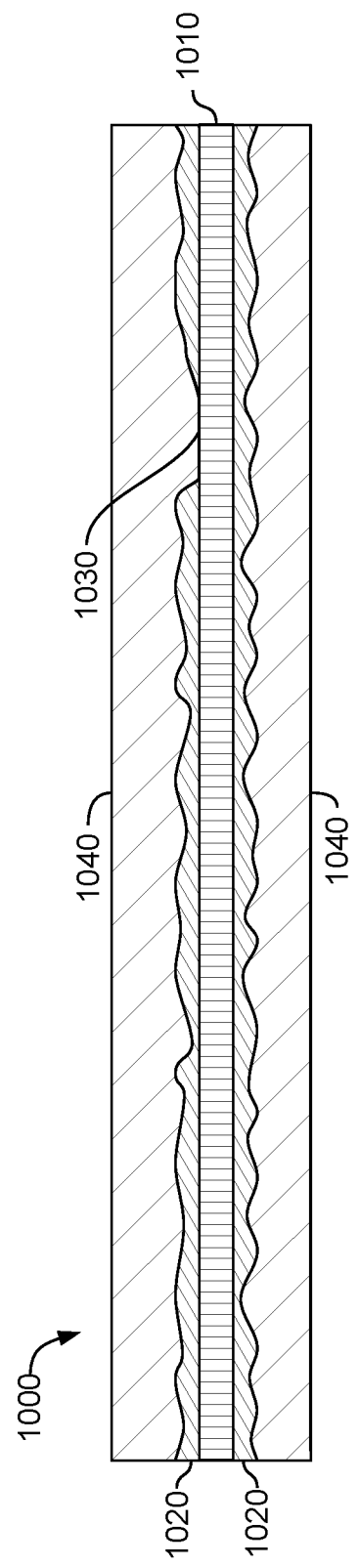
FIG. 10 is a cross-sectional view of an optically readable data storage medium encoded with a set of machine executable instructions for configuring an integrated circuit to perform an arithmetic operation of first and second floating-point numbers in accordance with some embodiments.

FIG. 10 shows a cross section of an optically-readable data storage medium 1000 which may be encoded with an aforementioned machine-executable program, to be carried out by systems such as the aforementioned personal computer, or other computer or similar device. Medium 1000 may be a Blu-ray disc (BD), a conventional compact disk (CD) read-only memory (ROM) or a digital versatile disk (DVD, sometimes also referred to as digital video disk) read-only memory (ROM), or any rewriteable medium such as a CD R, CD RW, DVD R, DVD RW, DVD+R, DVD+RW, or DVD-RAM or a magneto-optical disk which is optically readable and magneto-optically rewriteable. Medium 1000 may have a suitable substrate 1010 and a suitable coating 1020 usually on one or both sides of substrate 1010.

In the case of a CD-based or DVD-based medium, as is well known, coating 1020 is reflective and is impressed with a plurality of pits 1030, arranged on one or more layers, to encode the machine-executable program. The arrangement of pits is read by reflecting laser light off the surface of coating 1020. A protective coating 1040 may be provided on top of coating 1020.

In the case of magneto-optical disk, as is well known, coating 1020 has no pits 1030, but has a plurality of magnetic domains whose polarity or orientation may be changed magnetically when heated above a certain temperature, for example by a laser. The orientation of the domains may be read by measuring the polarization of laser light reflected from coating 1020. The arrangement of the domains may encode the program as described above.

The method and apparatus described herein may be incorporated into any suitable circuit or system of circuits. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using circuitry that efficiently performs floating-point arithmetic operations is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination.

The following examples pertain to further embodiments.

Example 1 is an integrated circuit that performs an arithmetic operation of first and second floating-point numbers, including: a partial product generator that generates a partial product of the first and second floating-point numbers, a rounding circuit coupled to the partial product generator that generates a normalized, rounded product with a first exponent range based on the partial product, a normalization circuit coupled to the partial product generator that generates a normalized, unrounded product with a second exponent range that is greater than the first exponent range based on the partial product and the first and second floating-point numbers, and a multiplexer coupled to the rounding circuit and the normalization circuit that selects a product of first and second floating-point numbers among the normalized, unrounded product and the normalized, rounded product based on a control signal.

Example 2 is the integrated circuit of example 1, wherein the normalization circuit optionally further includes a left shift circuit that receives a processed partial product and shifts the processed partial product to the left based on an additional control signal.

Example 3 is the integrated circuit of example 2, optionally further including: a control circuit that receives the first and second floating-point numbers and generates the control signal and the additional control signal.

Example 4 is the integrated circuit of example 3, wherein the first and second floating-point numbers have respective first and second exponents, and wherein the control circuit optionally further includes: logic circuitry that receives the first and second exponents and generates the additional control signal by determining if at least one of the first and second floating-point numbers is a denormalized floating-point number based on the first and second exponents.

Example 5 is the integrated circuit of any one of examples 3 or 4, wherein the first and second floating-point numbers have respective first and second mantissas, and wherein the control circuit optionally further includes: a first count-leading-zeros circuit that determines first leading zeros of the first mantissa; a second count-leading-zeros circuit that determines second leading zeros of the second mantissa; and an adder circuit that adds the first and second leading zeros.

Example 6 is the integrated circuit of example 1, optionally further including: adder circuitry that receives the product from the multiplexer and a third floating-point number and generates a normalized sum and a rounded sum based on the product and the third floating-point number, and includes: an additional multiplexer that outputs a sum of the product and the third floating-point number by selecting between the normalized sum and the rounded sum based on an additional control signal.

Example 7 is the integrated circuit of example 6, wherein the product and the third floating-point number have respective first and second mantissas and wherein the adder circuitry optionally further includes: a fixed-point adder circuit that generates a sum of the first and second mantissas.

Example 8 is the integrated circuit of example 7, wherein the adder circuitry optionally further includes: an additional fixed-point adder circuit coupled to the fixed-point adder circuit that adds a round bit to the sum of the first and second mantissas.

Example 9 is the integrated circuit of any one of examples 7 or 8, wherein the adder circuitry optionally further includes: a left shift circuit that generates the normalized sum by shifting the sum of the first and second mantissas a predetermined number of bits to the left.

Example 10 is the integrated circuit of example 6, wherein the sum of the product and the third floating-point number have a first floating-point precision, optionally further including: a cast function circuit that receives the sum of the product and the third floating-point number from the adder circuitry and generates an upconverted sum by converting the sum from the first floating-point precision into a second floating-point precision that is higher than the first floating-point precision.

Example 11 is the integrated circuit of example 10, wherein the cast function circuit increases the exponent size of the sum from the first to the second floating-point precision.

Example 12 is the integrated circuit of example 10, wherein the cast function circuit adjusts the bias of the exponent of the sum from the bias of the first floating-point precision to the bias of the second floating-point precision.

Example 13 is the integrated circuit of any one of examples 1-12, optionally further including: a storage circuit coupled to the partial product generator.

Example 14 is the integrated circuit of example 13, wherein the storage circuit is selected from the group consisting of a first-in first-out circuit, a last-in first-out circuit, a serial-in parallel-out shift register circuit, a random-access memory circuit, a read-only memory circuit, a content-addressable memory circuit, and a register file.

Example 15 is the integrated circuit of any one of examples 1-13, optionally further including: configurable interconnect circuitry coupled to the partial product generator.

Example 16 is a method for performing an arithmetic operation of first and second floating-point numbers with an integrated circuit, including: generating a partial product of the first and second floating-point numbers with a partial product generator; using a rounding circuit to generate a first product that is normalized and rounded and has a first exponent range based on the partial product; using a normalization circuit to generate a second product that is normalized and unrounded and has a second exponent range that is greater than the first exponent range based on the partial product and the first and second floating-point numbers; and generating a product of first and second floating-point numbers by selecting between the first and second products based on a control signal.

Example 17 is the method of example 16, optionally further including: generating the control signal by determining whether at least one of the first and second floating-point numbers is a denormalized floating-point number.

Example 18 is the method of any one of examples 16 or 17, wherein using the normalization circuit to generate the second product optionally further includes: left shifting a processed partial product based on an additional control signal.

Example 19 is the method of example 18, wherein the first and second floating-point numbers have respective first and second mantissas, optionally further including: determining first leading zeros of the first mantissa; determining second leading zeros of the second mantissa; generating a sum signal by adding the first and second leading zeros; and generating the additional control signal by subtracting one from the sum signal.

Example 20 is the method of any one of examples 16-17, wherein the product and a third floating-point number have respective first and second mantissas, optionally further including: using a fixed-point adder circuit to generate a sum of the first and second mantissas.

Example 21 is the method of example 20, optionally further including: using an additional fixed-point adder circuit coupled to the fixed-point adder circuit to generate a rounded sum by adding a round bit to the sum of the first and second mantissas; and using a left shift circuit to generate a normalized sum by shifting the sum of the first and second mantissas a predetermined number of bits to the left.

Example 22 is the method of example 21, optionally further including: using a multiplexer to select between the rounded sum and the normalized sum.

Example 23 is a non-transitory machine readable storage medium encoded with instructions for configuring an integrated circuit that includes a partial product generator, a normalization circuit coupled to the partial product generator, a rounding circuit coupled to the partial product generator, and a multiplexer coupled to the normalization circuit and the rounding circuit to perform an arithmetic operation of a first floating-point number having a first mantissa and a first exponent that has a first exponent range and a second floating-point number having a second mantissa and a second exponent that has the first exponent range, the instructions including: instructions to configure the partial product generator to generate a partial product of the first and second floating-point numbers; instructions to configure the normalization circuit to generate a normalized, unrounded product that has a second exponent range that is greater than the first exponent range based on the partial product and the first and second floating-point numbers; instructions to configure the rounding circuit to generate a normalized, rounded product of the first and second floating-point numbers based on the partial product; and instructions to configure the multiplexer to output a product of first and second floating-point numbers by selecting between the normalized, unrounded product and the normalized, rounded product based on a control signal.

Example 24 is the non-transitory machine readable storage medium of example 23, optionally further including: instructions to generate the instructions of example 23.

Example 25 is the non-transitory machine readable storage medium of example 23, wherein the instructions to configure the normalization circuit to generate the normalized, unrounded product optionally further include: instructions to configure logic circuitry in the normalization circuit to generate the control signal by determining if at least one of the first and second floating-point numbers is a denormalized floating-point number based on the first and second exponents.

Example 26 is the non-transitory machine readable storage medium of example 23, wherein the instructions to configure the normalization circuit to generate the normalized, unrounded product optionally further include: instructions to configure count-leading-zeros circuitry in the normalization circuit to determine first leading zeros of the first mantissa and second leading zeros of the second mantissa; instructions to configure an adder circuit in the normalization circuit to determine a sum of leading zeros by adding the first and second leading zeros; instructions to configure a subtractor circuit in the normalization circuit to determine a predetermined number of bits by subtracting one from the sum of leading zeros; and instructions to configure a left shift circuit in the normalization circuit to shift the partial product by the predetermined number of bits to the left.

Example 27 is the non-transitory machine readable storage medium of example 23, wherein the integrated circuit optionally further includes adder circuitry and an additional multiplexer, optionally further including: instructions to configure the adder circuitry to generate a normalized sum and a rounded sum based on the product and a third floating-point number; and instructions to configure the additional multiplexer coupled to the adder circuitry to output a sum of the product and the third floating-point number by selecting between the normalized sum and the rounded sum based on an additional control signal.

Example 28 is the non-transitory machine readable storage medium of example 27, wherein the instructions to configure the adder circuitry optionally further include: instructions to configure a fixed-point adder circuit in the adder circuitry to generate a sum of the first and second mantissas.

Example 29 is the non-transitory machine readable storage medium of example 28, wherein the instructions to configure the adder circuitry optionally further include: instructions to configure an additional fixed-point adder circuit in the adder circuitry coupled to the fixed-point adder circuit to add a round bit to the sum of the first and second mantissas.

Example 30 is the non-transitory machine readable storage medium of example 28, wherein the instructions to configure adder circuitry optionally further include: instructions to configure a left shift circuit in the adder circuitry to generate the normalized sum by shifting the sum of the first and second mantissas a predetermined number of bits to the left.

Example 31 is the non-transitory machine readable storage medium of example 27, wherein the integrated circuit optionally further includes a cast function circuit, and wherein the sum has a first floating-point precision, optionally further including: instructions to configure the cast function circuit to generate an upconverted sum by converting the sum from the first floating-point precision into a second floating-point precision that is higher than the first floating-point precision.

Example 32 is the non-transitory machine readable storage medium of example 31, wherein the instructions to configure the cast function circuit optionally further include: instructions to increase the exponent size of the sum from the first to the second floating-point precision.

Example 33 is the non-transitory machine readable storage medium of example 31, wherein the instructions to configure the cast function circuit optionally further include: instructions to adjust the bias of the exponent of the sum from the bias of the first floating-point precision to the bias of the second floating-point precision.

Example 34 is a second stage of a multiplier circuit that receives first and second floating-point numbers and a partial product of the first and second floating-point numbers from a first stage of the multiplier circuit, including: a first arithmetic operator circuit for generating a normalized, rounded product with a first exponent range based on the partial product; a second circuit for generating a normalized, unrounded product with a second exponent range that is greater than the first exponent range based on the partial product and the first and second floating-point numbers; and a selector circuit for selecting a product of first and second floating-point numbers among the normalized, unrounded product and the normalized, rounded product based on a control signal.

Example 35 is the second stage of example 34, wherein the second circuit optionally further includes: a left shift circuit for shifting a processed partial product to the left based on an additional control signal.

Example 36 is the second stage of example 35, optionally further including: a control circuit for generating the control signal and the additional control signal based on the first and second floating-point numbers.

Example 37 is adder circuitry that computes a sum of first and second floating-point numbers, including: a first arithmetic operator circuit that generates a normalized sum based on the first and second floating-point numbers; a second arithmetic operator circuit that shares a fixed-point adder circuit with the first arithmetic operator circuit, wherein the second arithmetic operator circuit generates a rounded sum based on the first and second floating-point numbers; and a multiplexer that selects between the normalized sum and the rounded sum based on a control signal.

Example 38 is the adder circuitry of example 37, wherein the first and second floating-point numbers have first and second exponents, optionally further including: a control circuit that compares the first and second exponents and generates the control signal that directs the multiplexer to select the normalized sum if the difference between the first and second exponents is greater than two.

The above described embodiments are presented for purposes of illustration and not of limitation, and the present invention is limited only by the claims that follow.

What is claimed is:

1. An integrated circuit that performs an arithmetic operation of first and second floating-point numbers, comprising:
    a partial product generator that generates a partial product of the first and second floating-point numbers;
    a rounding circuit coupled to the partial product generator that generates a normalized, rounded product with a first exponent range based on the partial product;
    a normalization circuit coupled to the partial product generator that generates a normalized, unrounded product with a second exponent range that is greater than the first exponent range based on the partial product and the first and second floating-point numbers; and
    a multiplexer coupled to the rounding circuit and the normalization circuit that selects a product of first and second floating-point numbers among the normalized, unrounded product and the normalized, rounded product based on a control signal.

2. The integrated circuit of claim 1, wherein the normalization circuit further comprises:
    a left shift circuit that receives a processed partial product and shifts the processed partial product to the left based on an additional control signal.

3. The integrated circuit of claim 2, further comprising:
    a control circuit that receives the first and second floating-point numbers and generates the control signal and the additional control signal.

4. The integrated circuit of claim 3, wherein the first and second floating-point numbers have respective first and second exponents, and wherein the control circuit further comprises:
    logic circuitry that receives the first and second exponents and generates the additional control signal by determining if at least one of the first and second floating-point numbers is a denormalized floating-point number based on the first and second exponents.

5. The integrated circuit of any one of claim 3 or 4, wherein the first and second floating-point numbers have respective first and second mantissas, and wherein the control circuit further comprises:
    a first count-leading-zeros circuit that determines first leading zeros of the first mantissa;
    a second count-leading-zeros circuit that determines second leading zeros of the second mantissa; and
    an adder circuit that adds the first and second leading zeros.

6. The integrated circuit of claim 1, further comprising:
    adder circuitry that receives the product from the multiplexer and a third floating-point number and generates a normalized sum and a rounded sum based on the product and the third floating-point number, and comprises:
        an additional multiplexer that outputs a sum of the product and the third floating-point number by selecting between the normalized sum and the rounded sum based on an additional control signal.

7. The integrated circuit of claim 6, wherein the product and the third floating-point number have respective first and second mantissas and wherein the adder circuitry further comprises:
    a fixed-point adder circuit that generates a sum of the first and second mantissas.

8. The integrated circuit of claim 7, wherein the adder circuitry further comprises:
    an additional fixed-point adder circuit coupled to the fixed-point adder circuit that adds a round bit to the sum of the first and second mantissas.

9. The integrated circuit of any one of claim 7 or 8, wherein the adder circuitry further comprises:
    a left shift circuit that generates the normalized sum by shifting the sum of the first and second mantissas a predetermined number of bits to the left.

10. The integrated circuit of claim 6, wherein the sum of the product and the third floating-point number have a first floating-point precision, further comprising:
    a cast function circuit that receives the sum of the product and the third floating-point number from the adder circuitry and generates an upconverted sum by converting the sum from the first floating-point precision into a second floating-point precision that is higher than the first floating-point precision.

11. The integrated circuit of claim 10, wherein the cast function circuit increases the exponent size of the sum from the first to the second floating-point precision.

12. The integrated circuit of claim 10, wherein the cast function circuit adjusts the bias of the exponent of the sum from the bias of the first floating-point precision to the bias of the second floating-point precision.

13. A method for performing an arithmetic operation of first and second floating-point numbers with an integrated circuit, comprising:
    generating a partial product of the first and second floating-point numbers with a partial product generator;
    using a rounding circuit to generate a first product that is normalized and rounded and has a first exponent range based on the partial product;
    using a normalization circuit to generate a second product that is normalized and unrounded and has a second exponent range that is greater than the first exponent range based on the partial product and the first and second floating-point numbers; and
    generating a product of first and second floating-point numbers by selecting between the first and second products based on a control signal.

14. The method of claim 13, further comprising:
    generating the control signal by determining whether at least one of the first and second floating-point numbers is a denormalized floating-point number.

15. The method of any one of claim 13 or 14, wherein using the normalization circuit to generate the second product further comprises:
    left shifting a processed partial product based on an additional control signal.

16. The method of claim 15, wherein the first and second floating-point numbers have respective first and second mantissas, further comprising:
    determining first leading zeros of the first mantissa;
    determining second leading zeros of the second mantissa;
    generating a sum signal by adding the first and second leading zeros; and
    generating the additional control signal by subtracting one from the sum signal.

17. The method of any one of claims 13-14, wherein the product and a third floating-point number have respective first and second mantissas, further comprising:
    using a fixed-point adder circuit to generate a sum of the first and second mantissas;
    using an additional fixed-point adder circuit coupled to the fixed-point adder circuit to generate a rounded sum by adding a round bit to the sum of the first and second mantissas; and
    using a left shift circuit to generate a normalized sum by shifting the sum of the first and second mantissas a predetermined number of bits to the left.

18. The method of claim 17, further comprising:
    using a multiplexer to select between the rounded sum and the normalized sum.

19. A non-transitory machine readable storage medium encoded with instructions for configuring an integrated circuit that comprises a partial product generator, a normalization circuit coupled to the partial product generator, a rounding circuit coupled to the partial product generator, and a multiplexer coupled to the normalization circuit and the rounding circuit to perform an arithmetic operation of a first floating-point number having a first mantissa and a first exponent that has a first exponent range and a second floating-point number having a second mantissa and a second exponent that has the first exponent range, the instructions comprising:
    instructions to configure the partial product generator to generate a partial product of the first and second floating-point numbers;
    instructions to configure the normalization circuit to generate a normalized, unrounded product that has a second exponent range that is greater than the first exponent range based on the partial product and the first and second floating-point numbers;
    instructions to configure the rounding circuit to generate a normalized, rounded product of the first and second floating-point numbers based on the partial product; and
    instructions to configure the multiplexer to output a product of first and second floating-point numbers by selecting between the normalized, unrounded product and the normalized, rounded product based on a control signal.

20. The non-transitory machine readable storage medium of claim 19, wherein the instructions to configure the normalization circuit to generate the normalized, unrounded product further comprise:
    instructions to configure logic circuitry in the normalization circuit to generate the control signal by determining if at least one of the first and second floating-point numbers is a denormalized floating-point number based on the first and second exponents;
    instructions to configure count-leading-zeros circuitry in the normalization circuit to determine first leading zeros of the first mantissa and second leading zeros of the second mantissa;
    instructions to configure an adder circuit in the normalization circuit to determine a sum of leading zeros by adding the first and second leading zeros;
    instructions to configure a subtractor circuit in the normalization circuit to determine a predetermined number of bits by subtracting one from the sum of leading zeros; and
    instructions to configure a left shift circuit in the normalization circuit to shift the partial product by the predetermined number of bits to the left.

21. The non-transitory machine readable storage medium of claim 19, wherein the integrated circuit further comprises adder circuitry and an additional multiplexer, further comprising:
    instructions to configure the adder circuitry to generate a normalized sum and a rounded sum based on the product and a third floating-point number; and
    instructions to configure the additional multiplexer coupled to the adder circuitry to output a sum of the product and the third floating-point number by selecting between the normalized sum and the rounded sum based on an additional control signal.

22. The non-transitory machine readable storage medium of claim 21, wherein the instructions to configure the adder circuitry further comprise:
    instructions to configure a fixed-point adder circuit in the adder circuitry to generate a sum of the first and second mantissas; and
    instructions to configure an additional fixed-point adder circuit in the adder circuitry coupled to the fixed-point adder circuit to add a round bit to the sum of the first and second mantissas.

23. A second stage of a multiplier circuit that receives first and second floating-point numbers and a partial product of the first and second floating-point numbers from a first stage of the multiplier circuit, comprising:
    a first arithmetic operator circuit for generating a normalized, rounded product with a first exponent range based on the partial product;
    a second circuit for generating a normalized, unrounded product with a second exponent range that is greater than the first exponent range based on the partial product and the first and second floating-point numbers; and
    a selector circuit for selecting a product of first and second floating-point numbers among the normalized, unrounded product and the normalized, rounded product based on a control signal.

24. The second stage of claim 23, further comprising:
    a left shift circuit in the second circuit for shifting a processed partial product to the left based on an additional control signal; and
    a control circuit for generating the control signal and the additional control signal based on the first and second floating-point numbers.

* * * * *